US011508071B2

(12) United States Patent
Metcalfe et al.

(10) Patent No.: US 11,508,071 B2
(45) Date of Patent: Nov. 22, 2022

(54) SYSTEM AND METHOD TO DETECT, SUPPRESS, AND MODIFY BACKGROUND REGIONS OF SCANNED DOCUMENTS

(71) Applicant: Xerox Corporation, Norwalk, CT (US)

(72) Inventors: David J. Metcalfe, Marion, NY (US); Clara Cuciurean-Zapan, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 272 days.

(21) Appl. No.: 17/023,646

(22) Filed: Sep. 17, 2020

(65) Prior Publication Data

US 2022/0084211 A1    Mar. 17, 2022

(51) Int. Cl.
*G06T 1/20* (2006.01)
*G06T 7/11* (2017.01)
*G06T 7/168* (2017.01)
*G06T 7/194* (2017.01)
*G06T 7/90* (2017.01)

(52) U.S. Cl.
CPC ............ *G06T 7/194* (2017.01); *G06T 1/20* (2013.01); *G06T 7/11* (2017.01); *G06T 7/168* (2017.01); *G06T 7/90* (2017.01)

(58) Field of Classification Search
CPC ... G06T 1/20; G06T 7/11; G06T 7/168; G06T 7/194
See application file for complete search history.

(56) References Cited

U.S. PATENT DOCUMENTS

| 6,665,434 | B1 * | 12/2003 | Yamaguchi | H04N 1/40056 358/518 |
| 7,551,334 | B2 * | 6/2009 | Li | H04N 1/4072 358/518 |
| 7,843,616 | B2 * | 11/2010 | Li | H04N 1/4072 358/1.9 |
| 7,873,232 | B2 * | 1/2011 | Malik | H04N 1/407 382/274 |
| 2002/0159080 | A1 * | 10/2002 | Feng | H04N 1/62 358/1.9 |

(Continued)

OTHER PUBLICATIONS

U.S. Appl. No. 16/830,479, filed Mar. 26, 2020, Metcalfe.
U.S. Appl. No. 16/830,419, filed Mar. 26, 2020, Metcalfe.

*Primary Examiner* — Yubin Hung
(74) *Attorney, Agent, or Firm* — Fay Sharpe LLP

(57) ABSTRACT

An image processing device includes an input device which receives image adjustment selections from an associated user interface device. Memory of the device stores a user interface generator, which generates a background adjustment selector for presenting to a user on the user interface device; a background adjustment component which, for each of a plurality of pixels of an input image computes adjusted color values, as a function of at least one of: (a) a background adjustment factor computed for the respective pixel, and (b) a background class derived from the computed background adjustment factor, the background adjustment factor being a function of a background strength of the pixel and a luminance strength of the pixel; and an image output component outputs an output image derived from the adjusted color values for the plurality of pixels. A processor implements the background adjustment component and image output component.

20 Claims, 18 Drawing Sheets

(56) References Cited

U.S. PATENT DOCUMENTS

| | | | |
|---|---|---|---|
| 2004/0183923 A1* | 9/2004 | Dalrymple | H04N 9/735 348/224.1 |
| 2004/0218832 A1* | 11/2004 | Luo | H04N 1/6027 382/167 |
| 2005/0152612 A1* | 7/2005 | Spaulding | G06T 5/00 382/254 |
| 2012/0014598 A1* | 1/2012 | Nakagawa | G06T 11/001 382/167 |
| 2017/0255849 A1 | 9/2017 | Xing | |
| 2018/0089810 A1* | 3/2018 | Hirai | G06T 11/60 |

* cited by examiner

SYSTEM AND METHOD TO DETECT, SUPPRESS, AND MODIFY BACKGROUND REGIONS OF SCANNED DOCUMENTS

CROSS REFERENCE TO RELATED PATENTS AND APPLICATIONS

Cross-reference is made to application Ser. No. 16/830,479, filed Mar. 26, 2020, entitled SYSTEM AND METHOD FOR PROCESSING AND ENHANCING ACHROMATIC CHARACTERS OF SCANNED DIGITAL DOCUMENTS, by Metcalfe, issued as U.S. Pat. No. 10,986,249 on Apr. 20, 2021, and application Ser. No. 16/830,419, filed Mar. 26, 2020, entitled SYSTEM AND METHOD TO DETECT AND ADJUST IMAGE BACKGROUND, by Metcalfe, et al., issued as U.S. Pat. No. 10,986,250 on Apr. 20, 2021, the disclosures of which are incorporated herein by reference in their entireties.

BACKGROUND

The exemplary embodiment relates to image adjustment and finds particular application in a system and method for background suppression and background modification.

Digital image capture devices, such as scanners and cameras, capture images as an array of pixels, with each pixel being assigned a set of color values in a multi-dimensional color space, such as RGB (red, green, blue) color space, referred to herein as an input color space. Processing images captured by digital devices is generally performed in a multi-dimensional color space with a larger gamut, such as the L*a*b* color space, referred to herein as a processing color space. The processed image may then be converted to a multi-dimensional output color space, suitable for rendering the processed image, such as CMYK (Cyan, Magenta, Yellow, and Black), in the case of printing.

During image processing, various adjustments to the image may be made, these adjustments are often performed sequentially, and may include image resolution adjustments, color corrections, removal of undesirable artifacts, cropping, and background suppression.

Background suppression is a useful function provided by the image path in copiers and multi-functional systems that removes or unifies the color of the background in the digitally acquired image. Background suppression removes the background or makes the background uniform to make the electronic image appear more uniform and consistent. Background suppression is more difficult for input images that contain poor contrast between foreground and background regions. Unwanted background may exist for many reasons, such as an aged, discolored, and/or dirty document(s) which are scanned to produce the input images. Additionally, the original may be printed on a color substrate or recycled paper which the customer generally does not want to reproduce. Thin paper stock may also be problematic, as this tends to increase the probability of show-through created by detecting and rendering content from the opposite side of a 2-sided print. Users generally do not want to have extraneous dots or background reproduced in their copies but rather desire to have a faithful rendition of the actual content contained within the original print. Background suppression helps to improve the contrast between the foreground and background regions. Background suppression also helps in minimizing compressed file size in applications such as scanning, document archiving, etc.

In order to achieve an acceptable throughput, the complexity of background suppression algorithms has generally been limited by the processing capabilities of image processing devices, such as printer processors. Algorithms have been developed which segment images into foreground and background regions and then apply a correction only to the background regions. A threshold is set with the aim of producing uniform background region(s), typically white (no color), without undesirably impacting the foreground region(s). The threshold may be close to, but less than, the maximum value. On the luminance channel, for example, with a scale of 0-255, where 0 is black and 255 is white, a threshold value 250 could be set and all pixel values at or above the threshold are increased, by applying a gain, to bring them to 255, i.e., white. However, pixels below 250 are not adjusted, remaining gray. The chrominance channels may be similarly adjusted. As a result, in many existing threshold-based segmentation classification algorithms, abrupt switching artifacts may be generated, which are visible in the output image as uneven foreground or background regions. These are often referred to as "punch-through" artifacts in halftone and highlight regions.

Further, advancements in the number of bits-per-pixel (bpp) available in output devices, such as marking engines, such as the change from 1 bpp to 8 bpp, have meant that these artifacts are more noticeable. Recently, advances have been made in processing hardware and software, allowing more complex algorithms to be used without impacting throughput.

A system and method for background adjustment are disclosed which can leverage the processing capabilities of more advanced processors to minimize the artifacts which may occur during background suppression and provide for background color selection.

INCORPORATION BY REFERENCE

The following reference, the disclosure of which is incorporated herein in its entirety by reference, is mentioned.

U.S. Pub. No. 20170255849 A1, published Sep. 7, 2017, entitled DOCUMENT BACKGROUND SUPPRESSION PERFORMED DURING COLOR SPACE CONVERSION, by Xing Li, et al., describes making background suppression corrections to an image after being converted from a first to a second color space and then into a third color space used by printing devices. The process of converting the image into the third color space samples nodes of the second color space values, classifies the nodes as background nodes or non-background nodes, multiplies the second color space values of the background nodes by a percentage less than 100%, and after multiplying, interpolates values between the nodes.

BRIEF DESCRIPTION

In accordance with one aspect of the exemplary embodiment, an image processing device includes an input device which receives image adjustment selections from an associated user interface device. Memory stores a user interface generator, which generates a background adjustment selector for presenting to a user on the user interface device, a background adjustment component which, for each of a plurality of pixels of an input image computes adjusted color values, as a function of at least one of: (a) a background adjustment factor computed for the respective pixel, and (b) a background class derived from the computed background adjustment factor. The background adjustment factor is a function of a background strength of the pixel and a luminance strength of the pixel. Memory also stores an image output component outputs an output image derived from the adjusted color values for the plurality of pixels. A processor implements the background adjustment component and image output component.

In accordance with another aspect of the exemplary embodiment, an image processing method includes receiving an input image comprising a plurality of pixels. For each of the plurality of pixels, the method includes computing a background strength of the pixel, computing a luminance strength of the pixel, and computing an adjusted luminance value and adjusted chrominance values for the pixel, as a function of a user-selected highlight color and the background strength and luminance strength of the pixel. The method further includes outputting an output image derived from the adjusted luminance and adjusted chrominance values for the plurality of pixels.

One or more steps of the method may be performed with a processor.

In accordance with another aspect of the exemplary embodiment, an image processing device includes an image adjustment unit which receives an input image, a selected highlight color, and a selected global adjustment factor. The image adjustment unit includes a background adjustment component which for each of a plurality of pixels of an input image, computes a background strength of the pixel, computes a luminance strength of the pixel, and computes adjusted luminance and adjusted chrominance values for the pixel, as a function of the background strength and luminance strength of the pixel, the selected highlight color and the selected global adjustment factor. An image output device receives an output image derived from the adjusted luminance and adjusted chrominance values for the plurality of pixels, and renders the output image by printing.

DETAILED DESCRIPTION

Figure 1:
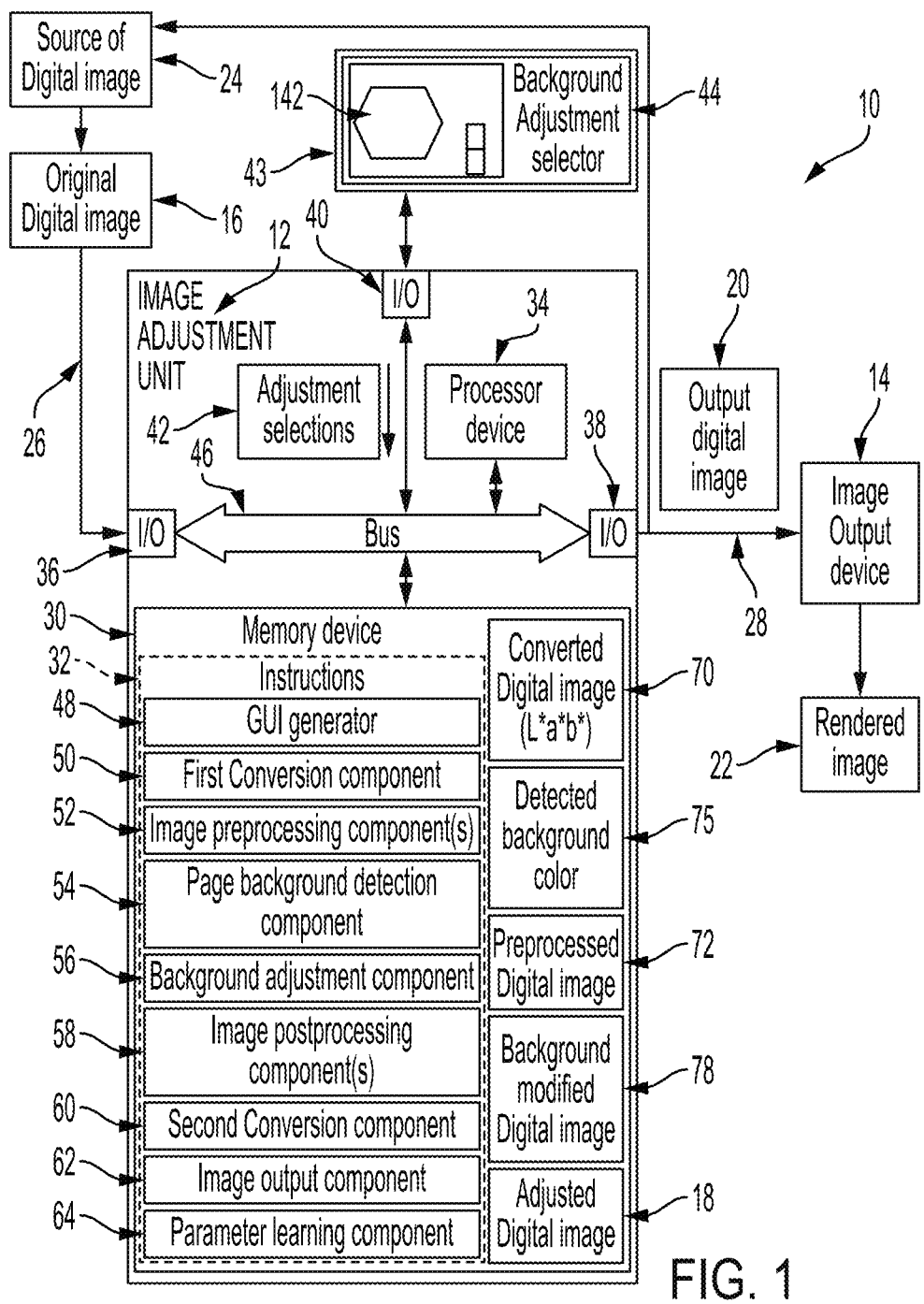
FIG. 1 is a functional block diagram of an image processing device incorporating a background adjustment component in accordance with one aspect of the exemplary embodiment.

A system and method are described which provide image processing incorporating background highlight mapping. The exemplary background highlight mapping may form a step in a software image path (SWIP), as described herein, or be performed as a stand-alone operation. The exemplary system and method identify potential background pixels and process them based on highlighting mapping instructions. The highlighting mapping instructions may be preset or may be selected by a user, such as a customer or other person inputting instructions for image processing.

Background highlight mapping, as use herein is a method for modifying the color of background pixels in an image. The color modification is tunable, allowing a user to fine-tune an amount of background modification that is applied to a document. In one embodiment, a customer is able to select the amount of background modification via a user interface. For a document or copy-job that was originally printed on color paper stock, this makes it possible to retain some of the document's background color but at a reduced saturation level. This feature may also be incorporated as an economy printing mode in order to reduce the amount of marking material, e.g., toner used for any given copy-job. This feature can also be incorporated as a scan file size minimization method when compressing images for scanning and distributing electronically or archiving.

In one embodiment of the highlight mapping, referred to herein as grayscale highlight mapping, the extent to which any identified background pixels are driven toward a selected highlight color is based upon the "background strength" (or neutral strength) of a pixel (as opposed to being fully labeled/classified as "background" versus "non-background") and optionally also on a global adjustment factor.

In another embodiment, referred to as direct highlight mapping, the extent in which identified background pixels are driven toward a user-selected highlight color is a function of a global adjustment factor.

In the absence of a user-selected highlight color, identified background pixels may be driven towards "pure white," by default (i.e., L*a*b*=255, 128, 128, respectively), referred to herein as white point mapping. In one embodiment, the default background adjustment may be based upon the "background strength" of a pixel (as opposed to being fully labeled/classified as "background" versus "non-background"), in a similar manner to the grayscale mapping method.

In one embodiment, the user (or an automated region selector) may select a region of identified background pixels or text characters in the identified background pixels which are to be processed according to one of the background highlighting methods (e.g., direct, grayscale, or default), while a second region of the identified background pixels or text characters in the identified background pixels are processed according to another of the background highlighting methods.

The system and method allow precise segmentation and classification of a document's background and foreground regions, thereby considerably improving the image quality of a resulting printed document. This improvement is especially important and noticeable within low-frequency halftone areas as well as other highlight regions where the paper background characteristics are close the document's foreground content.

The highlight mapping process allows background regions of a scanned document to be precisely altered and set to a preset or user-selectable color while leaving the remaining foreground areas unaltered. For example, the background regions of documents printed on color paper stock can be fully suppressed or otherwise slightly adjusted to either save toner or to retain the chromatic content but at a reduced saturation level.

As used herein, an "image output device" can include any device for rendering an image on print media, such as a copier, laser printer, bookmaking machine, facsimile machine, or a multi-function machine (which includes one or more functions such as scanning, printing, archiving, emailing, and faxing).

"Print media" can be a physical sheet of paper, plastic, or other suitable physical print media substrate for carrying images. For example, the print media can be substantially any type of media upon which a marking engine can print, such as: high quality bond paper, lower quality "copy" paper, overhead transparency sheets, high gloss paper, colored paper, and so forth. A "job" or "document" is referred to for one or multiple sheets copied from an original job sheet(s) or an electronic document page image, from a particular user, or otherwise related. According to systems and methods herein, a "job" can be a print job, a copy job, a scan job, etc.

An "original image" or "input image" is used herein to mean an electronic (e.g., digital) recording of information. The original image may include image data in the form of text, graphics, or bitmaps.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space, such as L*a*b*, using, for instance, an RGB-to-L*a*b* converter to obtain luminance (L*) and chrominance (a*b*) values. It should be appreciated that pixels may be represented by values other than RGB or L*a*b*.

The L*a*b* color space has an L dimension for lightness and a and b that are color-opponent dimensions (i.e., chrominance), and are based on nonlinearly compressed coordinates. The L*a*b* color space includes all perceivable colors, which means that its gamut exceeds those of the RGB and CMYK color spaces, but the L*a*b*-color space is device independent, which means that the colors are defined independent of their nature of creation or the device on which they are output (displayed or rendered).

FIG. 1 illustrates an exemplary image processing device 10. The image processing device includes an image adjustment unit 12 and optionally an image output device 14. The image adjustment unit 12 receives an original digital image 16, such as a scanned image, in a first (input) color space, such as RGB. The image adjustment unit 12 converts the original image 16 to a second color space, in particular, a luminance-chrominance color space, such as L*a*b*, in which image adjustments are made to form an adjusted digital image 18. The adjustments may include background adjustment. The image adjustment unit 12 may convert the adjusted digital image 18 to an output digital image 20 in a third (output) color space, in which the output device 14 operates, such as CMYK. The exemplary output device 14 includes a marking device which renders the output digital image 20 on print media, such as paper, using marking materials, such as inks or toners, to form a rendered (generally, hardcopy) image 22. The image processing device 10 may further include or be communicatively connected with a source 24 of original digital images, such as a scanner or computing device. In some embodiments, such as a scan-to-copy image processing path, the output image 20 may be stored in local or remote memory, such as in the source 24 of digital images. Components 12, 14, 24 of the image processing device 10 may be communicatively connected by wired or wireless links 26, 28, such as wires, a local area network, or a wide area network, such as the Internet.

The image adjustment unit 12 includes memory 30, which stores software instructions 32 for performing the processing steps that generate the adjusted image 18 and output image 20. A processor device ("processor") 34, in communication with the memory 30, executes the instructions. The image adjustment unit 12 also includes one or more input/output (I/O) devices 36, 38, 40 for communication with external devices, in particular, for receiving original images 16, outputting the output images 20, and receiving image adjustment selections 42 from a local or remote user interface device 43. The input/output (I/O) devices 36, 38, 40 allow the image adjustment unit 12 to communicate with other devices via a computer network, such as a local area network (LAN) or wide area network (WAN), or the internet, and may each comprise a modulator/demodulator (MODEM) a router, a cable, and/or Ethernet port.

The user interface device 43 displays a graphical user interface, such as the illustrated background adjustment selector 44. The user interface device 43 may be a display device incorporating a display screen and one or more user input components, such as a touchscreen, keyboard, keypad, cursor control device, voice command receiver, or the like. The user interface device 43 may be communicatively connected with the input/output device 40 by a wired or wireless link whereby the GUI 44 is transmitted to the user interface device 43 and user selections are received from the user interface device.

Hardware components 30, 34, 36, 38, 38, 40 of the image correction unit 12 may communicate via a data/control bus 46.

The image adjustment unit 12 may include one or more computing devices, such as a microprocessor, a PC, such as a desktop, laptop, or palmtop computer, portable digital assistant (PDA), server computer, cellular telephone, tablet computer, combination thereof, or other computing device capable of executing instructions for performing the exemplary method.

The memory 30 may represent any type of non-transitory computer readable medium such as random-access memory (RAM), read only memory (ROM), magnetic disk or tape, optical disk, flash memory, or holographic memory. In one embodiment, the memory 30 comprises a combination of random-access memory and read only memory. In some embodiments, the processor 34 and memory 30 may be combined in a single chip. Memory 30 stores instructions for performing the exemplary method as well as the processed data and may include one or more memory devices.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of the image output device 14. In one embodiment, the processor may be or include a special purpose processor that is specialized for processing image data and may include application-specific integrated circuits (ASICs) that are specialized for the handling of image processing operations, processing image data, calculating pixel values, and the like. The processor may include a raster image processor (RIP), which uses the original image description to RIP the job. Accordingly, for a print job, the print instruction data is converted to a printer-readable language. The print job description is generally used to generate a ready-to-print file. The ready-to-print file may be a compressed file that can be repeatedly accessed for multiple (and subsequent) passes.

The term "software instructions" or simply "instructions," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 32 include a graphical user interface (GUI) generator 48, a first (input image) conversion component 50, optionally one or more image preprocessing components 52, a page background detection component 54, a background adjustment component 56, optionally, one or more image post-processing components 58, a second (adjusted image) conversion component 60, an image output component 62, and an optional parameter learning component 64. As will be appreciated, one or more of components 48, 50, 52, 54, 56, 58, 60, 62 and 64 may be separate or combined and may be software or hardware components.

The GUI generator 48 generates a graphical user interface (GUI) for display on the UI 43. The GUI includes a background adjustment selector 44, which provides for the user to make background adjustment selections 42 on the user interface 43, e.g., via a touchscreen, keypad, or the like incorporated in the device 43 or otherwise associated therewith.

Figure 2:
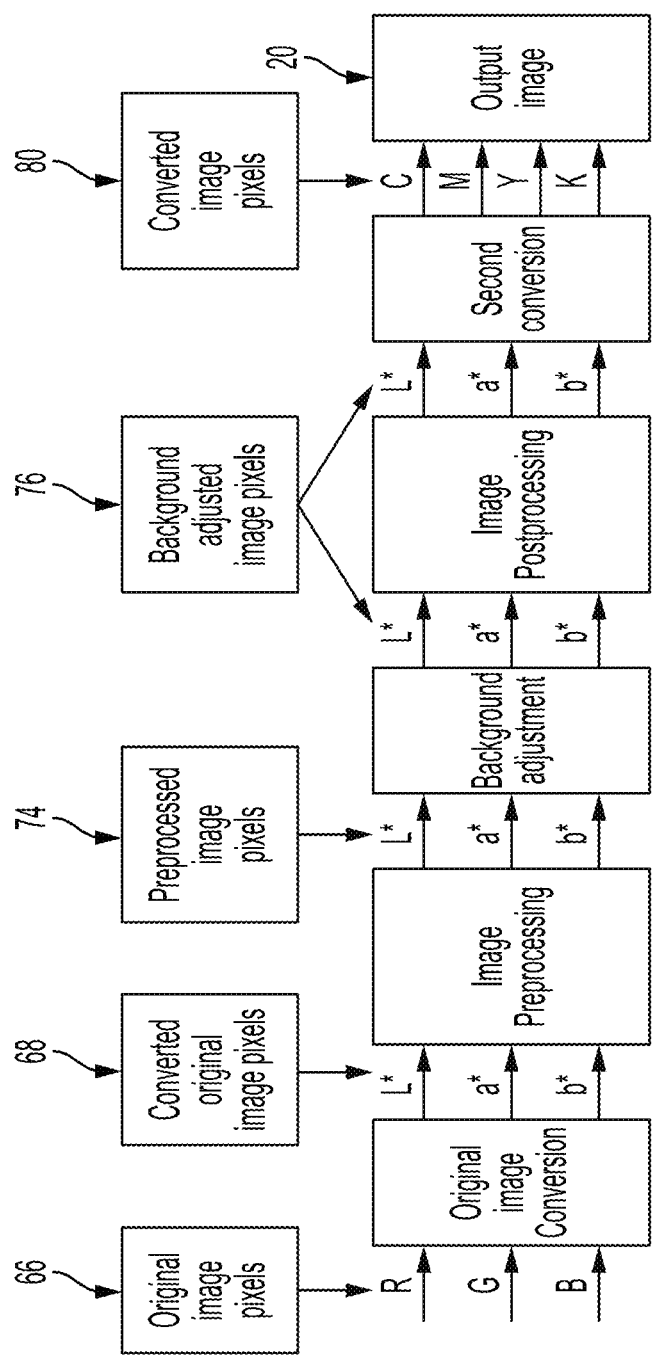
FIG. 2 is a flow chart which illustrates a software image processing path in accordance with another aspect of the exemplary embodiment.

With reference also to FIG. 2, assuming that the input image 16 is not already in a luminance-chrominance color space, the first conversion component 50 receives the original image 16 in the first color space and converts the pixels 66 of the original image 16 to pixels 68 forming a converted image 70 (FIG. 1) in the second (luminance-chrominance) color space. This is illustrated in FIG. 2 by conversion from RGB to L*a*b*. As will be appreciated, if the original image 16 is already in the second color space, the first conversion component 50 may be omitted. The conversion may be performed with a look-up table or using other methods, such as using appropriate conversion equations.

The optional image preprocessing component(s) 52 may perform various preprocessing operations on the converted image pixels 68 in the second color space. These operations may include one or more of cropping, scaling, padding, and the like. As will be appreciated, one or more of these operations may additionally or alternatively be performed later in the software image path. The output of the preprocessing is an optionally preprocessed image 72 containing preprocessed image pixels 74 in the second color space.

The optional page background detection component 54 detects a background color 75 for each page and may segment a sequence of incoming pages into sets of pages having similar background color. The component 54 may incorporate a page-based or leading-edge background detection kernel to assign a single background color to the entire page. This enables the component 56 to treat pages with "white" backgrounds differently from those with color backgrounds (non-white). In this way, the page background can be dynamically adjusted on a document-by-document (or page-by-page) basis based upon the current scanner and paper media attributes. This allows full or partial background suppression capabilities when a mixture of both color and standard white paper stock is contained in the same copy job. The component may perform a simple detection of the color 75 of a background region, such as in a margin of the page (i.e., outside the normal printed region), so that all pages within a preselected range of color values are classed as "white background," while other pages may be classified with an average L*a*b* background value which is other than white. As examples in the following, pages with detected pink and yellow color backgrounds are illustrated.

The overall print image quality can be improved by the page background detection component 54 as the exact background detection profile can be dynamically adjusted on a document-by-document basis based upon the current scanner and paper media attributes, thereby allowing full or partial background suppression capabilities when a mixture of both color and standard white paper stock is contained in the same copy job.

The background adjustment component 56 applies a background adjustment to the pixels 74 of the page image 70 or 72, in accordance with any user selections via the background adjustment selector 44 or by using default selections. The output of the background adjustment operation is background-adjusted image pixels 76, i.e., pixels of a background-modified image 78, some of which may have been adjusted with the objective of providing improved image quality and/or background highlighting.

The optional image post-processing component(s) 58 may perform various post-processing operations on the pixels of the background-adjusted image 78 in the modified second color space to form the adjusted image 18. Where no post-processing is performed, the background-adjusted image 78 serves as the adjusted image 18.

The second conversion component 60 converts the adjusted image 18 to pixels 80 of an output image 20 in the third color space, such as CMYK.

The images 16, 18, 20, 70, 72, 78 may be temporarily stored in memory 30, or in a separate memory, during processing.

The image output component 62 outputs the output image 20 to the image output device 14, e.g., via the I/O device 38. Alternatively, the output image may be stored in memory or output to a remote computing device and/or memory storage device.

During the image processing described herein, the original image 16 may be converted to a bit mapped image indicating a value to print at each pixel of the image.

The optional parameter learning component 64 learns one or more parameters of the system, such as look up tables, scalar parameters, and the like.

Figure 3:
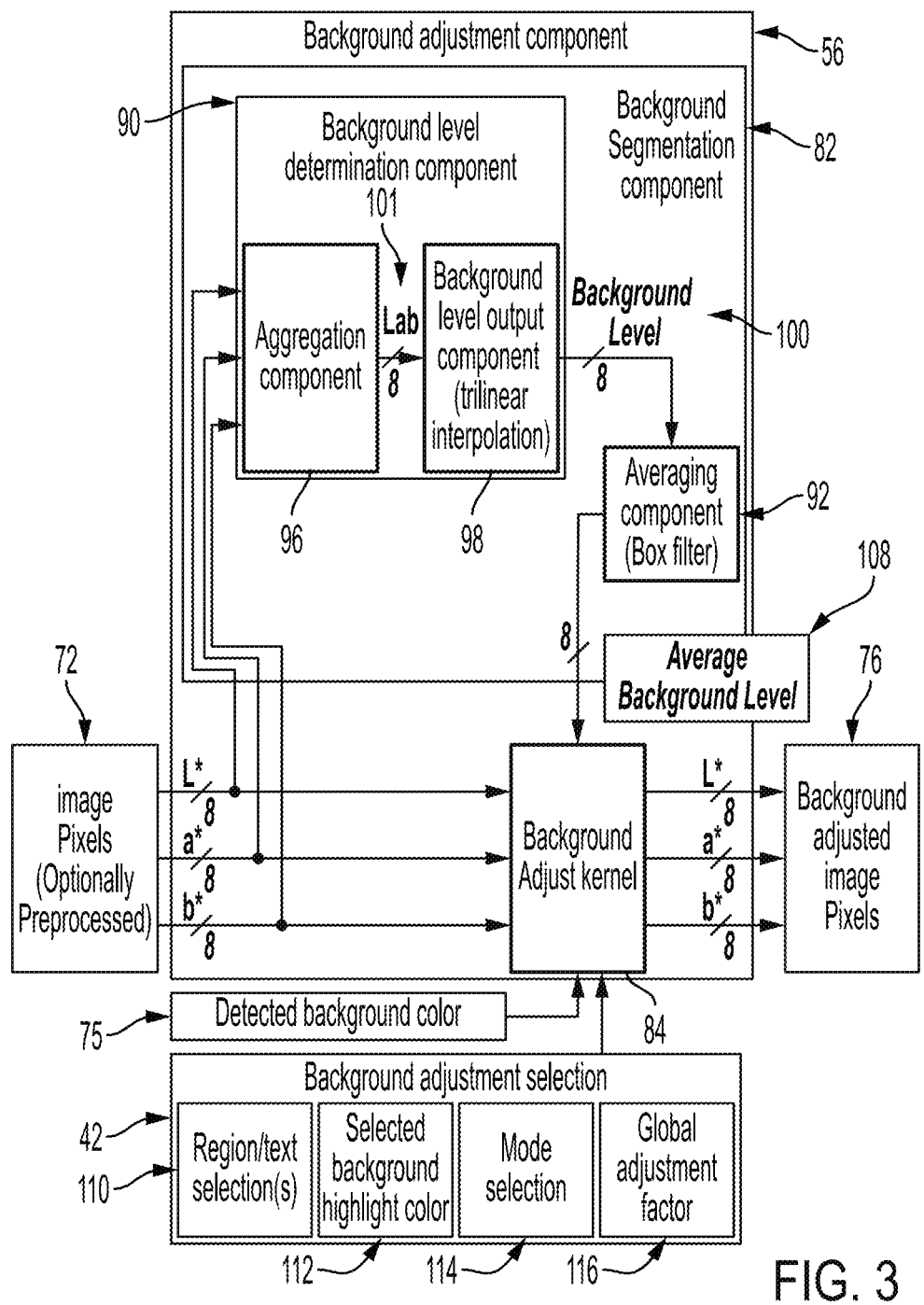
FIG. 3 illustrates one embodiment of a background adjustment component in the device of FIG. 1.

With reference to FIG. 3, an exemplary background adjustment component 56 is illustrated. The illustrated inputs to component 56 are, for each pixel of the image, 8 bpp for each channel, i.e., L*, a*, b* values, each of which are a sequence of 8 bits in which each bit can be 0 or 1, corresponding to a range of 0-255. However, other scales are contemplated.

The background adjustment component 56 includes a background segmentation component 82 and a background adjust kernel 84. In one embodiment, the background segmentation component 82 assigns a background level (or average background level), to all pixels in the image, which is an indicator of how likely each pixel is to be a background pixel. In another embodiment, the background segmentation component 82 segments the image into background and foreground regions and identifies all pixels in the background region as being background pixels.

The illustrated background segmentation component 82 includes a background level determination component 90 and an averaging component 92. Component 90 includes a planar to pixel aggregation component 96 and a background level output component 98, which may operate through trilinear interpolation.

The background level determination component 90 outputs a background level 100, which is essentially a probability that a given pixel is a background pixel. In the exemplary embodiment, a first pixel with an L* value which is closer to 0 (i.e., black on a scale of 0-255) than a second pixel receives a lower background level value than the second pixel, assuming the a* and b* values of the two pixels are the same.

In the illustrated embodiment, the background level 100 is an 8 bit output, i.e., each pixel has a background level of from 0 to 255 on a decimal scale, although this could alternatively be on a scale of 0-1 or 0-100, or other non-binary scale with a range of possible values. The determination of the background level 100 is made for each pixel, and is a function of its L*, a*, and b* values, without reference to surrounding pixels.

In the illustrated embodiment, the aggregation component 96 concatenates the input L*, a*, and b* values into a single Lab channel value 101 for ease of computation by the background level determination component 90. The output is a sequence of 24 bits composed of the L*, a*, and b* bit sequences. For example, if the L*, a*, and b* values are (1,0,0,0,0,1,0,0), (0,0,0,0,0,1,0,1), and (0,0,0,0,0,0,0,0,1), aggregation component outputs (1,0,0,0,0,1,0,0,0,0,0,0,0,0,1, 0,1,0,0,0,0,0,0,0,0,1) as the aggregated Lab value 101.

The background level output component 98 receives the Lab value 101 and outputs the background level 100 as a function thereof. The background level output component 98 functions essentially as a look up table (LUT). To reduce memory requirements, trilinear interpolation may be used to compute intermediate values between a set of stored lattice points. In this embodiment, the most significant bits are used to access lattice points within the 3D color gamut (which form eight points of a cube around an interpolation point corresponding to the pixel). The number of significant bits used may be selected to provide a tradeoff between image quality and computing time. The lattice points are each associated, in the LUT, with a respective background level. Interpolation is then performed to determine the background level for the pixel. In the exemplary embodiment, trilinear interpolation is performed in the X,Y,Z color space, but other color spaces are contemplated. In one embodiment, the trilinear interpolation LUT includes 3,375 lattice point integer values (i.e., a 15×15×15 LUT), although smaller or larger LUTs are contemplated. As will be appreciated if memory size is not constrained, interpolation could be replaced with a larger LUT, which possibly may achieve a slightly higher image quality.

Figure 4:
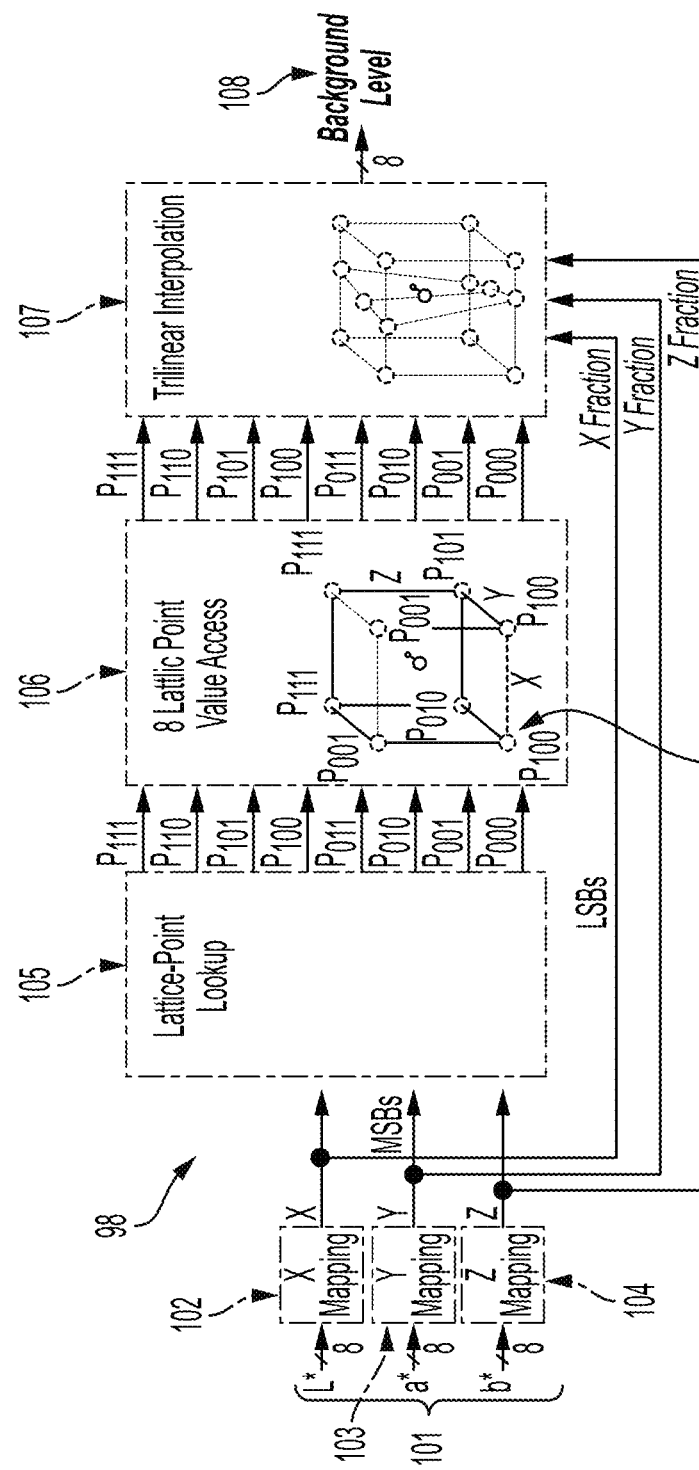
FIG. 4 illustrates background level determination by trilinear interpolation.

FIG. 4 graphically illustrates the operation of an exemplary background level output component 98. The L*a*b* values are mapped to corresponding CIE XYZ tristimulus values using respective mapping LUTs 102, 103, 104. The XYZ values, defined on orthogonal axes, are input to a lattice point LUT 105, which identifies the eight closest lattice points 106, denoted $P_{110}$, $P_{101}$, $P_{100}$, $P_{011}$, $P_{010}$, $P_{001}$, $P_{000}$. A trilinear interpolation kernel 107 computes the Euclidean distance from the pixel P to each lattice point. As illustrated, this includes generating a path from the pixel to the lattice point using the 3 perpendicular X, Y, Z axes and computing the Euclidean distance (shortest path) therefrom. The background level output is then a function of the background levels assigned to each of the lattice points as an inverse function of the Euclidean distance, e.g.:

Background level =

$$\left(\frac{BL1}{D1} + \frac{BL2}{D2} + \frac{BL3}{D3} + \frac{BL4}{D4} + \frac{BL5}{D5} + \frac{BL6}{D6} + \frac{BL7}{D7} + \frac{BL8}{D8}\right)$$

where BL1 to BL8 are the background levels assigned to the eight lattice points (stored in LUT 105) and D1-D8 are the corresponding calculated Euclidean distances (normalized so that they sum to 1).

The trilinear interpolation component 98 provides a flexible and robust method in which to program the input remapping LUTs 102, 103, 104 and 3D lattice points 106 to determine which L*a*b* triplet values or color gamut regions should be classified as "background" pixels.

The LUTs 102, 103, 104, 105 (FIG. 4), used by the background level output component 98 may be generated to optimize image quality given a set of images of the type to be processed. In one embodiment, two or more LUT's 105 may be stored and the user provided with the option to select one of the stored LUTs, based on personal preference. To compute the background levels in the LUT, a pixel's neutral magnitude can be derived from Equation (1):

$$\text{Neutral magnitude} = \text{maximum of } 0 \text{ and } \sqrt{Max_a^2 + Max_b^2} - \sqrt{a^2 + b^2}. \quad (1)$$

or a function thereof. i.e., when the value is less than 0, it is set to 0. $Max_a$ and $Max_b$ are the maximum absolute a* and b* values which define a neutral boundary 128 (FIG. 5) between background and non-background regions of the L*a*b* gamut. The LUT may apply a value of 0 to all pixels outside the boundary 128. For white point mapping, the $Max_a$ and $Max_b$ a* and b* pixel values may be defined within a +/−14 range around the neutral axis in order to provide sufficient neutral background detection for most customer paper stock/media applications. For grayscale mapping, one or more colored regions is also considered for defining a* and b* values as neutral background FIG. 6.

The optional averaging component 92 (FIG. 3) adjusts the background level 100 of a given pixel, output by the background level determination component 90, to take into account the background levels 100 of a set of local (e.g., surrounding) pixels. In one embodiment, the component 92 outputs, for each pixel of the image, an average background level 108. This provides the ability to segment relatively low-frequency halftone screens/regions that would otherwise be classified simply as background. Taking into account the attributes of neighboring pixels can reduce the abrupt segmentation switching artifacts that could otherwise occur in a purely point process classification scheme. In one embodiment, the average background level is the average of 9 pixels forming a box with the given pixel as the central pixel, with the eight nearest surrounding pixels. In other embodiments, a larger number of surrounding pixels may be considered. In some embodiments, different weights may be applied to surrounding pixels, e.g., depending on their closeness to the given pixel. The averaging component 92 can be any suitable box filter, such as a 3×3, 5×5, or 7×7 box filter. The result of the averaging is that the background level of the given pixel is shifted closer to that of the surrounding pixels.

In another embodiment, suited to direct highlight mapping, the background level 100 or average background level 108 may be thresholded or used to access a look up table, which generates a binary yes or no decision as to whether the pixel is classed as background or not. Other methods of generating a yes/no decision for background pixels are also contemplated, as described in greater detail with reference to FIG. 11.

The background adjust kernel 84 (FIG. 3) takes as input the original (or preprocessed) L*, a*, b* values 70, 72, for each of the image pixels 68 or 74 and applies a background adjustment. In one embodiment, the adjustment is a function of the background level 100 (or 108, if computed), such that pixels with a high background level 100 (or 108) receive a greater adjustment than pixels with a relatively lower background level 100 (or 108). The extent of the adjustment and direction, in color space, of the adjustment is also a function of background adjustment selections 42 input from the background adjustment selector 44 and/or the detected background color 75. In another embodiment, the extent of the adjustment and direction, in color space, of the adjustment is primarily a function of the background adjustment selections 42 input from the background adjustment selector 44 and/or the detected background color 75, for those pixels classed as background.

In one embodiment (FIG. 3), the user inputs 42 include one or more of a region/text selection 110, a background highlight color selection 112, a mode selection 114, and a global adjustment factor (GAF) selection 116. The region/text selection 110 identifies a background region that the user wishes to have processed and/or text in the background region that the user wishes to have highlighted. The background highlight color selection 112 identifies a color to be used in the highlighting. The mode selection 114 identifies one of a plurality of highlighting modes (e.g., white point, grayscale, or direct mapping for background pixels of a background region or the entire image). The global adjustment factor (GAF) selection 116 identifies a global adjustment factor to be used in each of the modes (which may be 0 or 1 by default). The GAF is applied uniformly to each pixel undergoing adjustment and is thus independent of the luminance and chrominance values of the pixel.

The background adjust kernel 94 may have a plurality of modes of operation, such as two, three, or more modes, which can be identified in the mode selection 114. In a first of these modes, referred to as white point mapping, the extent in which any background pixels are driven toward "pure white" (i.e., L*a*b*=255, 128, 128, respectively), is based upon the (average) background level 108 of the pixel in question as opposed to being fully labeled/classified as "background" versus "non-background". In a second mode, referred to as grayscale highlight mapping, rather than background pixels being driven toward "pure white," as in white point mapping, background pixels are driven towards a user-selected color value, which may be specified in the background highlight selection 112. The selected color can be a similar color value to the actual background color, e.g., more or less pink for a pink color background, or can be a completely different color, such as yellow. In both the first and second modes, the new pixel color may also be a function of a global adjustment factor 116, i.e., a factor which is applied to the identified background pixels uniformly. A single mode may combine the white point mapping and grayscale mapping modes, with a selected highlight color being selected from white and other colors. In a third mode, referred to as direct highlight mapping, identified background pixels are replaced with a user-selected color value 112 or with a color which is a function of a user-selected color value and the global adjustment factor 116.

The background adjustment selector 44 may allow the customer to fully suppress the background level(s) on any document that was printed on a wide range of color paper stock using an accurate page background detection component 54. Likewise, the customer may decide to retain some of the document's background color but at a reduced saturation level. This feature may also be combined with "economy printing" and/or "draft mode" in order to reduce the amount of toner deposited on documents printed for any given copy-job.

Figure 5:
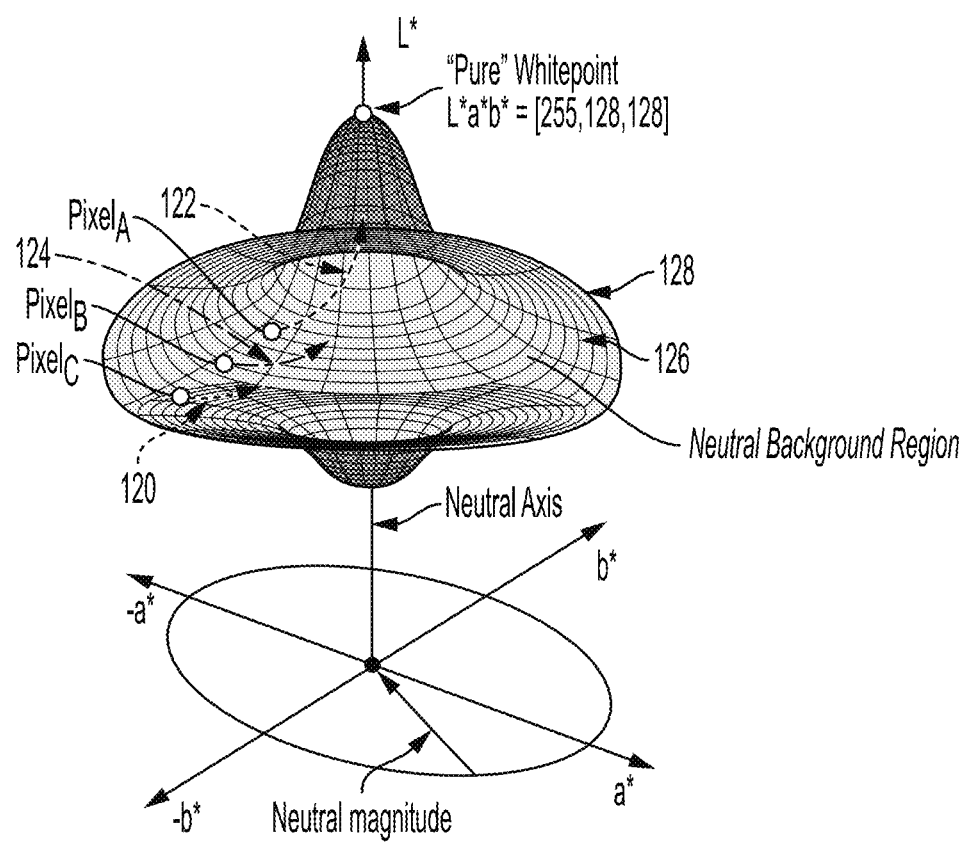
FIG. 5 graphically illustrates changes to image pixels during background adjustment by white point mapping in one aspect of the exemplary method.

FIG. 5 illustrates the white point mapping mode where the arrows 120, 122, 124 indicate the extent to which three illustrative pixels, denoted $Pixel_A$, $Pixel_B$, and $Pixel_C$, are moved towards pure white. $Pixel_A$ is shifted more than $Pixel_B$ and $Pixel_C$, due to the a*b* components being closer to the L* neutral axis. Similarly, $Pixel_B$ is adjusted more toward pure white than Pixel, due to the a*b* components being closer to the L* neutral axis. In addition to moving closer to the L* axis, the pixels' a*b* values are also shifted towards neutral values (128, 128), with $Pixel_A$ being shifted more than $Pixel_B$ and $Pixel_C$.

A background (neutral) region 126 of the L*a*b* color gamut shown in FIG. 5 is defined and generated by appropriately programming the trilinear interpolation lattice points and input remapping LUTs to encompass whatever regions of the L*a*b* gamut are to be classified as background. The remaining parts of the color gamut are considered to be foreground. A circumference 128 of the background region defines the border between neutral background pixels and foreground image pixels. Pixels whose values are on or within the border 128 are candidates for adjustment (i.e., they may be adjusted, but not necessarily, while those outside the border receive no adjustment). In this example, the background region 126 of the color gamut is circular and centered around the a*b* neutral axis on the lighter regions of the L*axis. This is suitable for the majority of documents printed on white paper.

Figure 6:
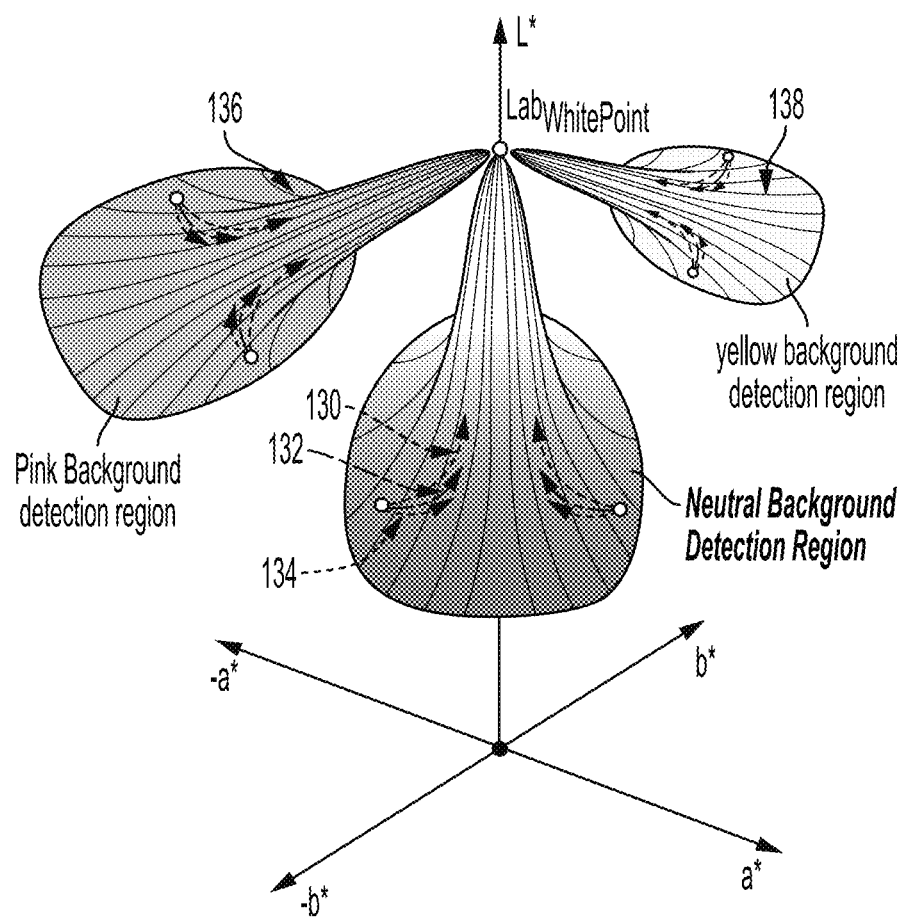
FIG. 6 graphically illustrates changes to image pixels during background adjustment by grayscale highlight mapping in another aspect of the exemplary method.

However, for a copy printed on yellow colored paper stock, for example, the background region can be contained and programmed within the yellow L*a*b* region(s) so that further adjustments to those (yellow background) pixels can be realized using the same variable processing method, as illustrated, for example, in FIG. 6. The degree of background adjustment can thus be adjusted, based upon customer preference and/or other factors (such as reduced toner usage). For example, for a highly chromatic "yellow paper" copy the background can be suppressed to achieve a much lighter yellow hue in order to maintain at least some of the background content of the original print. Alternatively, the yellow background region could be eliminated while still maintaining the full integrity of the print content. By providing the ability to change/program the "pure white" L*a*b* values used to derive adjustment values can be used to achieve a similar, but different background adjustment effect. For example, to create a light pink background from a white background, pixel adjustment values based upon a detected L*a*b* (pink) value 75 or selected L*a*b* (pink) value 112 can be created. FIG. 6 illustrates the grayscale highlight mapping mode, where the arrows 130, 132, 134 illustrate changes to R, G, and B components, respectively, of pixels in the neutral background region and automatic modifications in exemplary pink and yellow parts 136, 138 of the color gamut to pink and yellow pixels.

Figure 7:
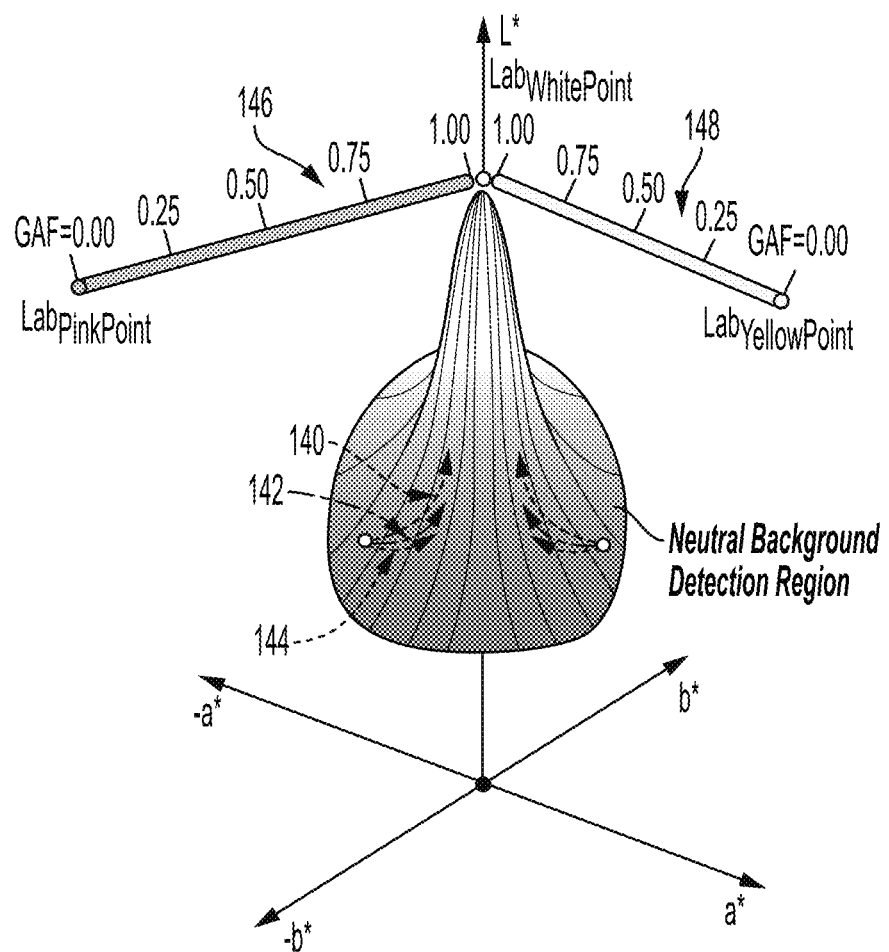
FIG. 7 graphically illustrates changes to image pixels during background adjustment by direct highlight mapping in one aspect of the exemplary method.

FIG. 7 illustrates the direct highlight mapping mode, where the arrows 140, 142, 144 illustrate changes to R, G, and B components, respectively, of pixels in the neutral background region and modifications in exemplary pink and yellow parts 146, 148 of the color gamut to those pixels, based on a user-selected global adjustment factor (GAF). In the illustrated embodiment, a user can select a "pink" GAF in the range of 0 to 1 for background colors which are detected as having a color value within a predetermined range of the "pink" color 75 and/or can select a "yellow" GAF in the range of 0 to 1 for background colors which fall within the "yellow" range of background values. A GAF of 0 retains more of the background color, on average, than a GAF closer to 1.

Figure 8:
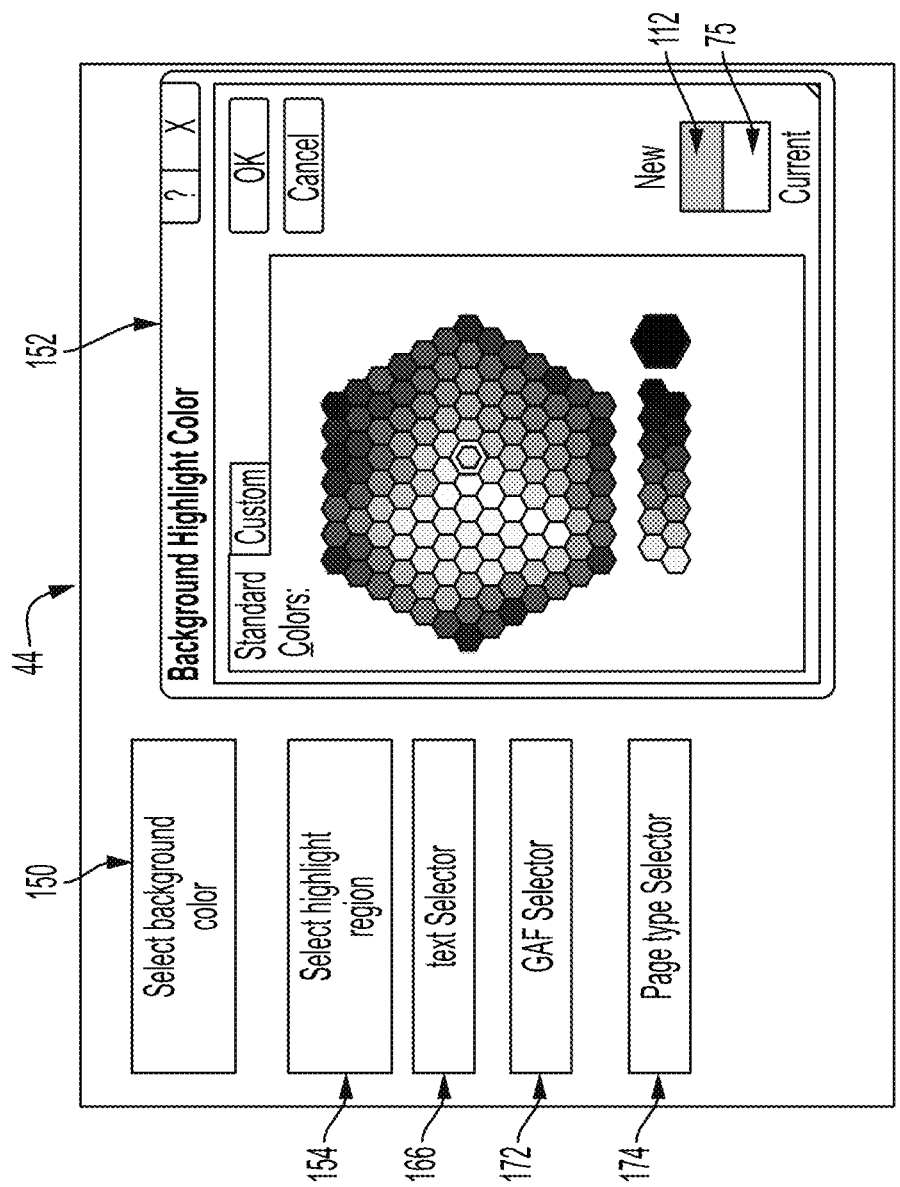
FIG. 8 illustrates an exemplary user interface in the system of FIG. 1.

With reference now to FIG. 8, an illustrative background adjustment selector 44 is shown. A user may use a "select background color" button or icon 150 to select a background color. A window 152 opens to provide a color wheel or other color selector. The current (detected) color 75 of the background may be displayed in the window 152, allowing the user to select the same color or to change to a new color 112. In the event that the user does not select a background color 112, "pure white" or the detected background color 75 may be selected by default.

Figure 9:
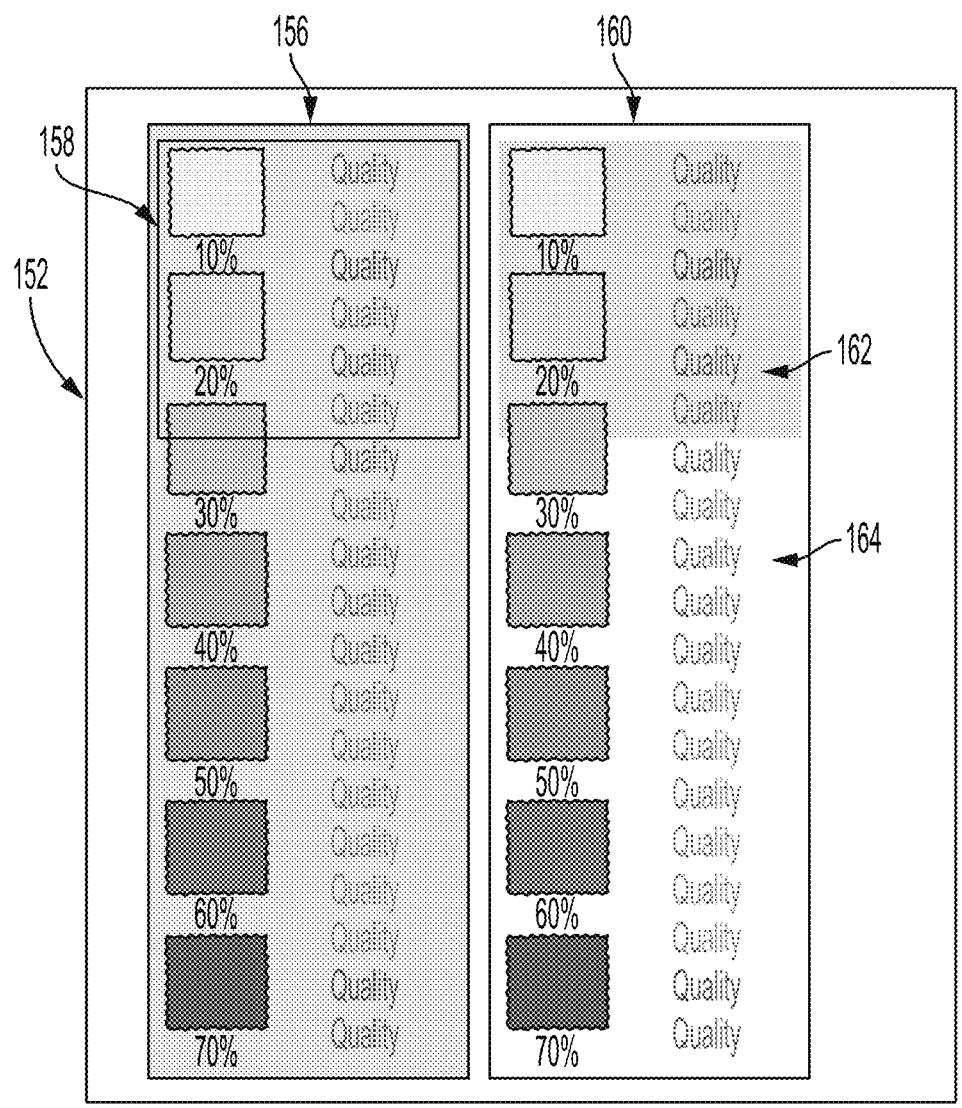
FIG. 9 illustrates a window for region selection in the exemplary user interface of FIG. 8.

A second icon or button 154 provides a "select highlight region" function. This function may be used in combination with the select background color function 150. When button 154 is selected, a scan 156 of the page to be printed may be displayed in the window 152, allowing the user to draw or otherwise define a bounding box 158, as illustrated in FIG. 9. While the bounding box is illustrated as a rectangular bounding box, other regular shapes or a freeform bounding box, are also contemplated. Background pixels within the bounding box 158 are replaced with or driven towards the selected background color 112 while background pixels outside the bounding box are driven towards pure white in this example (or vice versa). The window 152 may also display a simulated scan 160 (an approximation) of what the page could look like when the modifications are made. It is to be appreciated that while FIG. 9 is shown in grayscale, for ease of illustration, region 162 of the simulated scan 160 (corresponding to the bounding box 158) would appear in the window 152 as having, for example a yellow background color, while the (non-background) word "Quality" has the same color as in the scan 156. Similarly, in region 164, the pixels identified as background are shown as "white" while the word "Quality" has the same color as in the scan 156.

Figure 10:
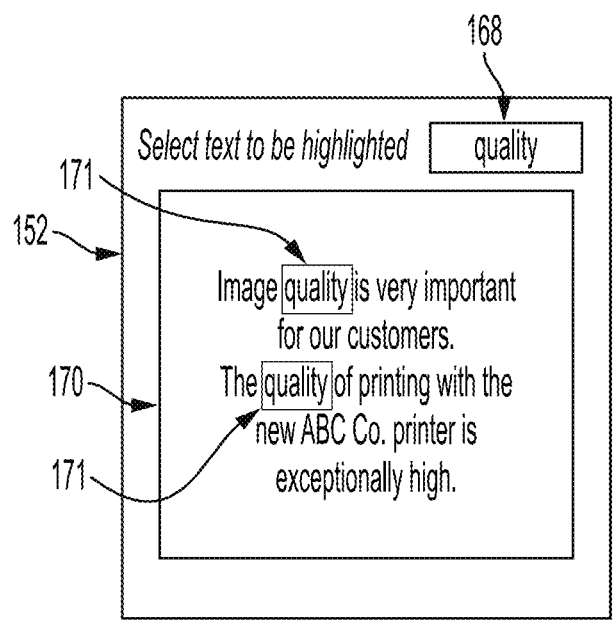
FIG. 10 illustrates a window for text selection in the exemplary user interface of FIG. 8.

A third icon or button 166 (FIG. 8) allows a user to select text to be highlighted. A window 152 (FIG. 10) may open when this function is actuated which allows a user to type a sequence of characters to be highlighted, e.g., the word "quality" in a text entry box 168. The scan 16 is then OCR processed to identify instances in the text of the selected character sequence. A simulated scan 170, with the identified instances 171 highlighted in the user-selected color 112, may be displayed in the window. The highlighting may take the form of a rectangle of colored pixels which closely surrounds the instances 171. Alternatively, or additionally, the pixels of the instances 171 themselves may be colored based on the selected color 112.

A fourth icon or button 172 (FIG. 8) provides a GAF selection function, which controls the extent to which background pixels are driven toward the background highlight color 112. A higher GAF value results in a given background pixel being driven more towards the selected background highlight color (or pure white) than if a lower GAF value is selected. The user may be presented with a slider or other input mechanism for selecting the GAF. A simulated scan, similar to that illustrated in FIG. 9, may be presented in a window 152, which visualizes the effect of changing the GAF.

A fifth icon or button 174 provides a "page type selector" function which enables the user to input different instructions for different pages. For example, a user may select to treat pages with "white" backgrounds differently from those with "pink" or "yellow" backgrounds, as identified by the page background detection component 54.

As will be appreciated, various ones of the functions 150, 154, 166, 172, 174 may be combined.

Figure 11:
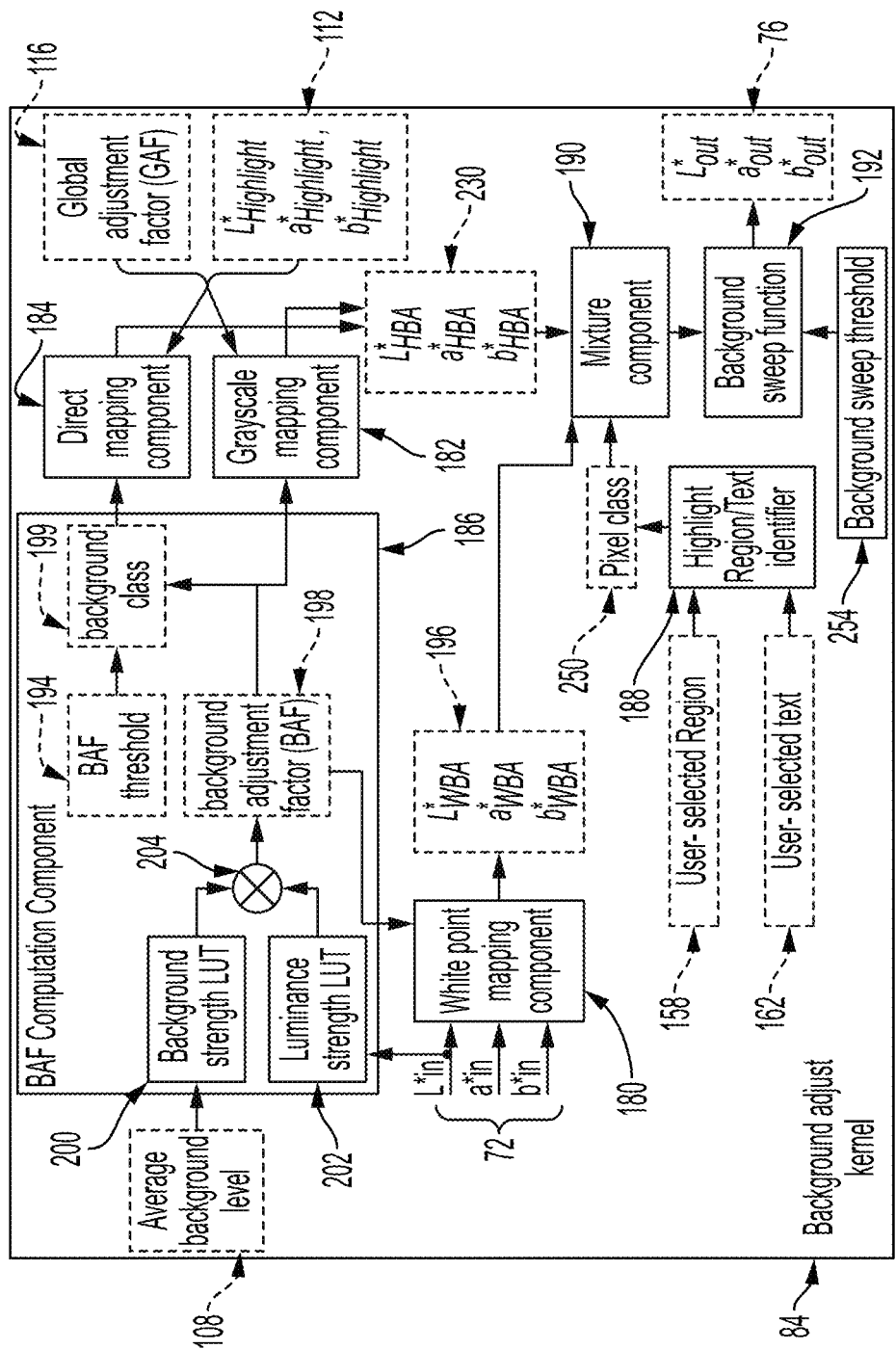
FIG. 11 is a schematic block diagram of a background adjust kernel for the background adjustment component of FIG. 3, in accordance with one aspect of the exemplary embodiment.

With reference to FIG. 11, a functional block diagram of one embodiment of the background adjust kernel 84 of FIG. 3 is illustrated. The background adjust kernel 84 processes the incoming L*a*b* image 72 and outputs background adjusted image pixels 76. The illustrated kernel 84 includes a white point mapping component 180, a grayscale mapping component 182, a direct mapping component 184, a background adjustment factor (BAF) computation component 186, a highlight/region identifier 188, a mixture component 190, and a background sweep function component 192. However, it is to be appreciated that the background adjust kernel 84 may operate with fewer, more, or different components.

The optional white point mapping component 180 maps the input values 72 of background pixels to white point background adjusted pixels (WBA L*, a*, and b*) 196. This may be performed using the method of above-mentioned application Ser. No. 16/830,479 or 16/830,419. Briefly, this method includes adjusting each pixel as a function of a likelihood that the pixel is a background pixel, as represented by a background adjustment factor 198 output by the BAF computation component 186. The adjustment may also be a function of the global adjustment factor (GAF) 116.

Figure 12:
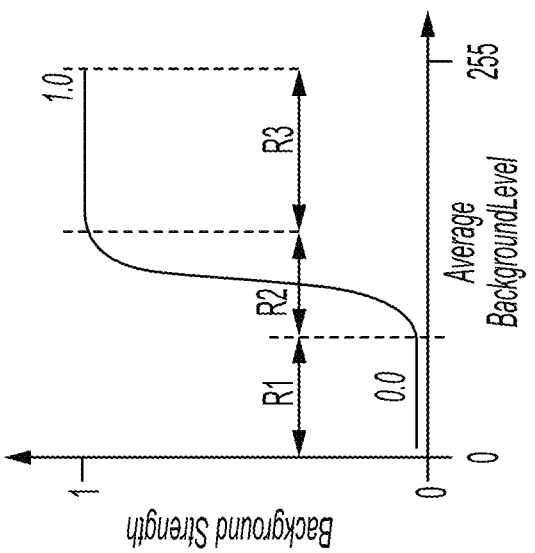
FIG. 12 illustrates an exemplary conversion function for computing background strength of a pixel.
Figure 13:
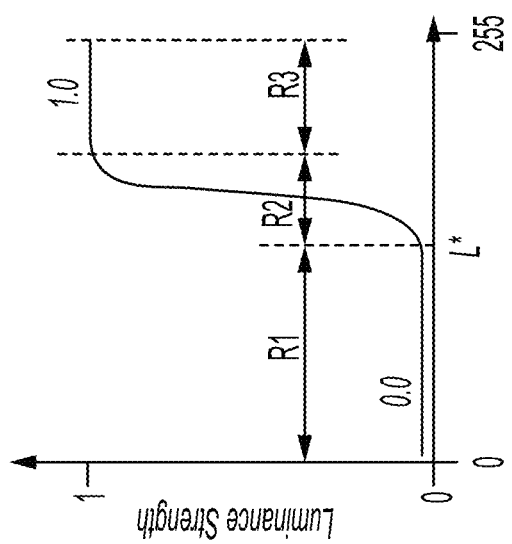
FIG. 13 illustrates an exemplary conversion function for computing luminance strength of a pixel.

The BAF computation component 186 receives as input the (average) background level (ABL) 108 computed by the averaging component 92 (FIG. 3) and the luminance value L* 72 of the pixel and computes the background adjustment factor 198 for the pixel as a function thereof. In the illustrated embodiment, component 186 includes a background strength LUT 200, a luminance strength LUT 202 and an aggregation factor 204. The background strength LUT 200 converts the average background level 108 to a background strength according to a first non-linear function. The luminance strength LUT 202 converts the luminance (L*) value of the pixel to a luminance strength according to a second non-linear function. In an example embodiment, the luminance and background strength LUTs 200, 202 are each 256-element, floating-point LUTs, as described, for example, in copending U.S. Ser. No. 16/830,419. The programmable aggregation factor 204 aggregates (e.g., multiplies) the luminance strength and background strength to generate the background adjustment factor 198. FIGS. 12 and 13 illustrate example non-linear functions which could be applied by LUTs 200 and 202. The background adjustment factor 198 is thus a function of the pixel's average background level of the pixel, which in turn is a function of the aggregated luminance and chrominance (L*a*b*) values of the pixel, as modified to reflect those of surrounding pixels, as well as the L* value of the pixel, which is independent of luminance values of surrounding pixels. For direct mapping, the BAF 198 may be converted (e.g., with an LUT) to a binary value 199 (or class), corresponding to whether the pixel is to be considered background or not.

FIG. 12 illustrates an example first non-linear function which may be applied by LUT 200. For a first range R1 of background levels, e.g., from 0-90 on a scale of 0-255, i.e., where there is a very low probability that the pixel is background, the background strength is set to 0 (or a very low value close to 0), on a scale of 0-1. For a second range R2 of background levels, e.g., from 90-220 on a scale of 0-255, i.e., where there is a moderate probability that the pixel is background, the background strength increases with increasing background level, e.g., exponentially up to the maximum background strength (1 in the exemplary embodiment). All pixels in a third region R3, e.g., with an average background level of from 220 to 255, are automatically assigned the maximum background strength of 1. As will be appreciated, the three ranges are adjustable and fewer or more than 3 ranges may be used. In other embodiments, different functions may be applied.

FIG. 13 illustrates an example second non-linear function which may be applied by LUT 202. For a first range R1 of L* values, e.g., from 0-120 on a scale of 0-255, i.e., where there is a very low probability that the pixel is background, the luminance strength is set to 0 (or a very low value close to 0), on a scale of 0-1. For a second range R2 of L* values, e.g., from 120-240 on a scale of 0-255, i.e., where there is a moderate probability that the pixel is background, the luminance strength increases with increasing L* value, e.g., exponentially up to the maximum background strength (1 in the exemplary embodiment). All pixels in a third region R3, e.g., with an L* value of from 220 to 255, are automatically assigned the maximum luminance strength of 1. As will be appreciated, the three ranges are adjustable. In other embodiments, different functions may be applied. In the following, it is assumed that each of the background and luminance strength 256-element LUTs has an output floating-point range between 0.0 to 1.0.

The background adjust factor 198 is thus a function of the background strength and luminance strength output by the respective LUTs 200, 202. In one embodiment, the aggregating function 204 is a multiplication function such that the background adjust factor 198 is the product of the background strength and luminance strength. As a result, when at least one of the background strength and luminance strength is 0, the background adjust factor 198 is 0 and when both of the background strength and luminance strength are non-0, the background adjust factor 198 is greater than 0 and has a maximum value of 1. Each of the background and luminance strength 256-element LUTs 200, 202 has an output floating-point range between 0.0 to 1.0, which are multiplied together to form the composite Background Adjust Factor value 198.

The BAF computation component 186 may use the BAF 198 to compute a background class 208 for the pixel. Pixels having a BAF 198 which is above a threshold 194 (e.g., 0 or 0.1) receive a background class 208 of 1 (background), while pixels at or below the threshold 194 receive a background class of 0 (non-background).

Figure 14:
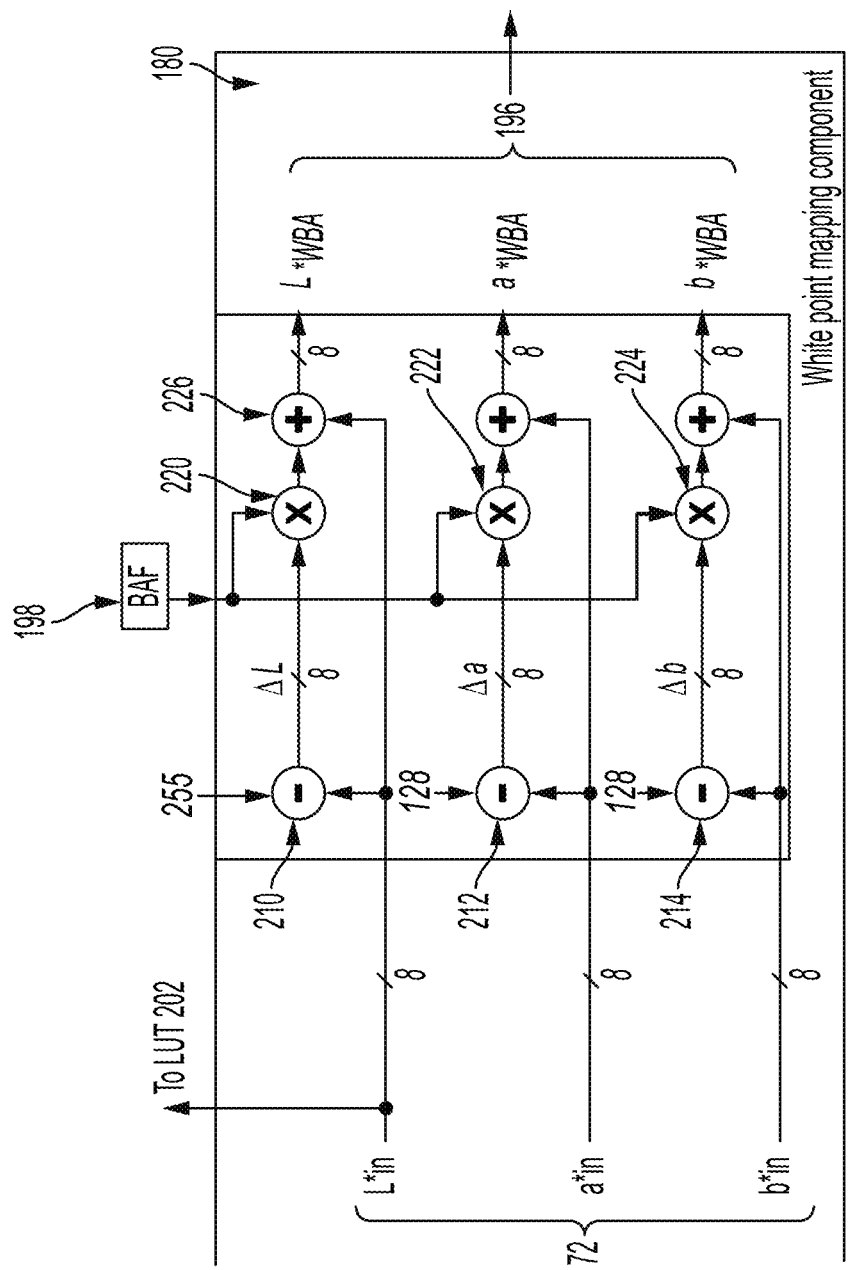
FIG. 14 illustrates an exemplary white point mapping component for the background adjust kernel of FIG. 11.

As illustrated in FIG. 14, when white point mapping is selected as the mode to be used for some or all of the image pixels, the input L*, a*, b* values 72 for these pixels may be processed by the white point mapping component 180. At 210, a difference value ΔL is computed by subtracting the input L* value from the maximum L* value ($L_{max}$) of 255. Similarly, at 212 and 214, difference values Δa and Δb are computed by subtracting the input a* (resp. b*) value from the maximum a* value ($a_{max}$*, resp. $b_{max}$*) of 128. The background adjustment factor 198 is employed by a luminance adjust function 220 to adjust the L* value of the pixel and by corresponding chroma adjust functions 222, 224 to adjust the a* and b* values, respectively. For example, as illustrated in FIG. 14, ΔL is multiplied by the background adjust factor as illustrated at 220, and the result is added to the input luminance value L* at 226 to generate an adjusted L* value, denoted $L_{WBA}$*. As will be appreciated, a single computation could be used to compute WBA L*:

$$L_{WBA}* = L* + [(L_{max}* - L*) \times \text{BAF}] \qquad (2)$$

where BAF represents the background adjust factor 198.

Similarly, the same background adjust factor is used to compute adjusted chrominance values $a_{WBA}$*, $b_{WBA}$*, where $a_{max}$* and $ab_{max}$* are both 128:

$$a_{WBA}* = a* + [(a_{max}* - a*) \times \text{BAF}] \qquad (3)$$

$$b_{WBA}* = b* + [(b_{max}* - b*) \times \text{BAF}] \qquad (4)$$

As an example, if BAF is 0.9, and the input L*, a*, and b* values are (240, 123, 127), the three background adjusted values 196 are (254, 128, 128), i.e., closer to pure white but not exactly pure white. When BAF is lower (a lower probability of being a background pixel), the adjustment will be less.

In the exemplary embodiment, the difference values ΔL*, Δa* and Δb* are determined as the Cartesian distance to pure white (255, 128, 128), although another point in the color gamut could be selected.

As a result, if the computed background strength and luminance strength are sufficiently high (based upon the LUT profiles), the pixel's composite white point background adjust value(s) 196 will be close to or exactly equal to "1.0", which would apply the maximum delta value to each L*a*b* component, thereby forcing the pixel to a pure white value. If the pixel falls outside the "background" region or gamut as defined and derived within the programmable trilinear lattice point tables, the pixel's composite background adjust value will be equal to "0.0", which would effectively pass the incoming L*a*b* pixel values unmodified to the output. On the other hand, if a pixel happens to fall in close proximity or within the boundary between "background" and "non-background" regions, the composite background adjust range will vary between 0.0 and 1.0, thereby adjusting the pixel's L*a*b* value based upon the "neutrality" of the incoming pixel. In effect, this neutralizes pixels classified as background and dynamically adjusts their L*a*b* values toward pure white in a variable manner in order to avoid and minimize the abrupt switching artifacts that are traditionally problematic in threshold-based segmentation algorithms.

Figure 15:
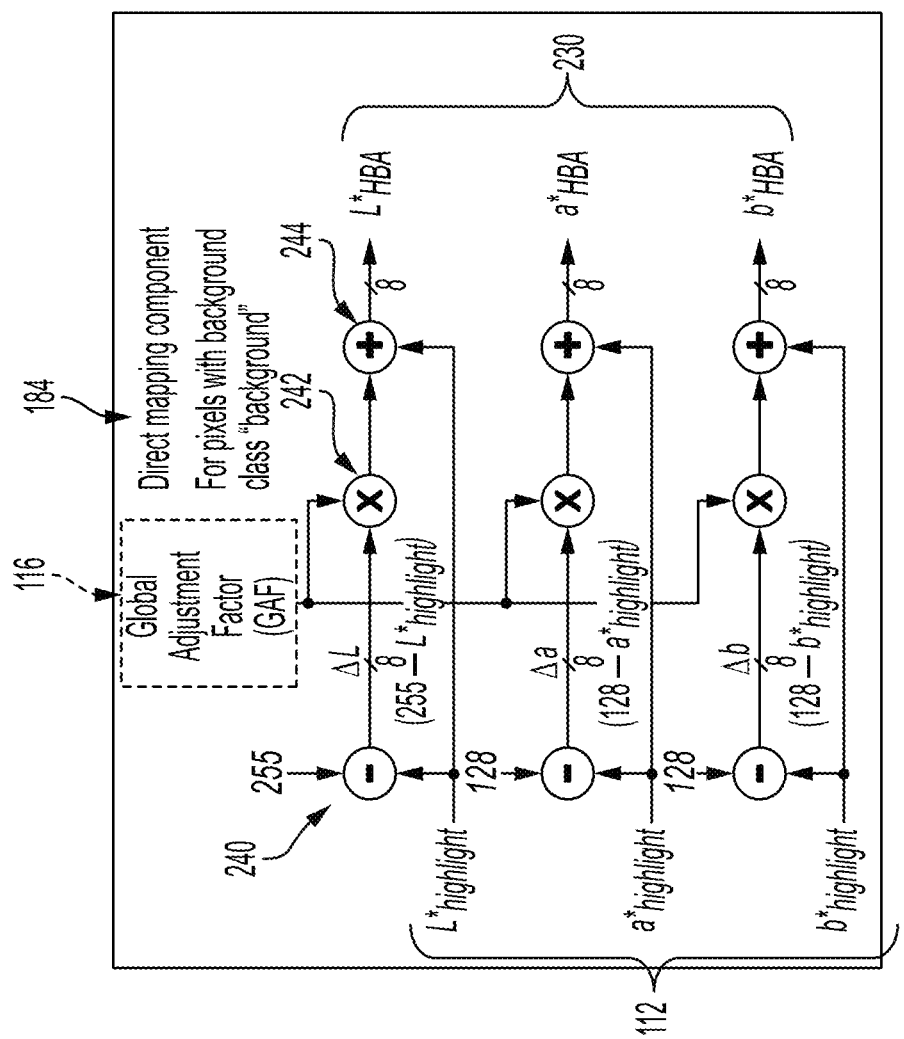
FIG. 15 illustrates an exemplary direct mapping component for the background adjust kernel of FIG. 11.

With reference to FIG. 15, one embodiment of the direct mapping component 184 of FIG. 11 is illustrated. The direct mapping component 184 receives as input the $L_{Highlight}^*$, $a_{Highlight}^*$ and $b_{Highlight}^*$ values 112 (selected by the user or generated automatically) and the global adjustment factor 116 (selected by the user or by default) and outputs highlight background adjust values $L_{HBA}^*$, $a_{HBA}^*$ and $b_{HBA}^*$ 230 for pixels classified as background. The adjust values may be computed for all pixels of the image classed as background or for a selected subset, e.g., identified by user selections with the highlight region selector 154 and/or text selector 166 (FIG. 8). The $L_{HBA}^*$, $a_{HBA}^*$ and $b_{HBA}^*$ 230 are thus independent of the input L*a*b* values 72 for pixels classified as background. The classification of pixels as background may be a function of the background adjustment factor 198. Pixels having a BAF 198 which is above the threshold 194 (e.g., 0 or 0.1) receive a background class 199 of 1 (background), while pixels at or below the threshold 194 receive a background class of 0 (non-background), and are not processed by the direct mapping component 184.

The direct mapping component 184 applies a direct highlight mapping equation to compute the HBA values 230 for background pixels (pixels with a background class 199 corresponding to "background"):

$$Lab_{HBA}=Lab_{Highlight}+(GAF\times(Lab_{WhitePoint}-Lab_{Highlight})) \quad (5)$$

where $Lab_{HBA}$ represents the output highlight background adjust (HBA) values 230, $Lab_{Highlight}$ represents the selected highlight color 112, GAF is the selected Global Adjustment Factor 116, on a scale of 0-1, and $Lab_{WhitePoint}$ is the respective L*, a*, b* value of pure white.

Thus, for example, if a user selects a pink color with L*a*b* values of (83,24,4) as the selected $Lab_{Highlight}$ 112 and a GAF 116 of 0.5, the output values are computed as follows:

$$L_{HBA}^*=83+(0.5\times(255-83))=169$$

$$a_{HBA}^*=24+(0.5\times(128-24))=76$$

$$b_{HBA}^*=4+(0.5\times(128-4))=66$$

The output $Lab_{HBA}$ 230 is thus (169,76,66) (with values being rounded to the nearest integer).

FIG. 15 illustrates how this may be achieved in simplified steps. For example, at 240, the selected $L_{highlight}^*$ is subtracted from the L* for pure white ($L_{max}^*$=255) to generate a difference value ΔL. At 242, this is multiplied by the selected GAF value 116 and at 244, added to the $L_{highlight}^*$ value to generate $L_{HBA}^*$. A similar process is performed for computing $a_{HBA}^*$ and $b_{HBA}^*$, using $a_{max}^*$ and $b_{max}^*$=128 in place of $L_{max}^*$.

Figure 16:
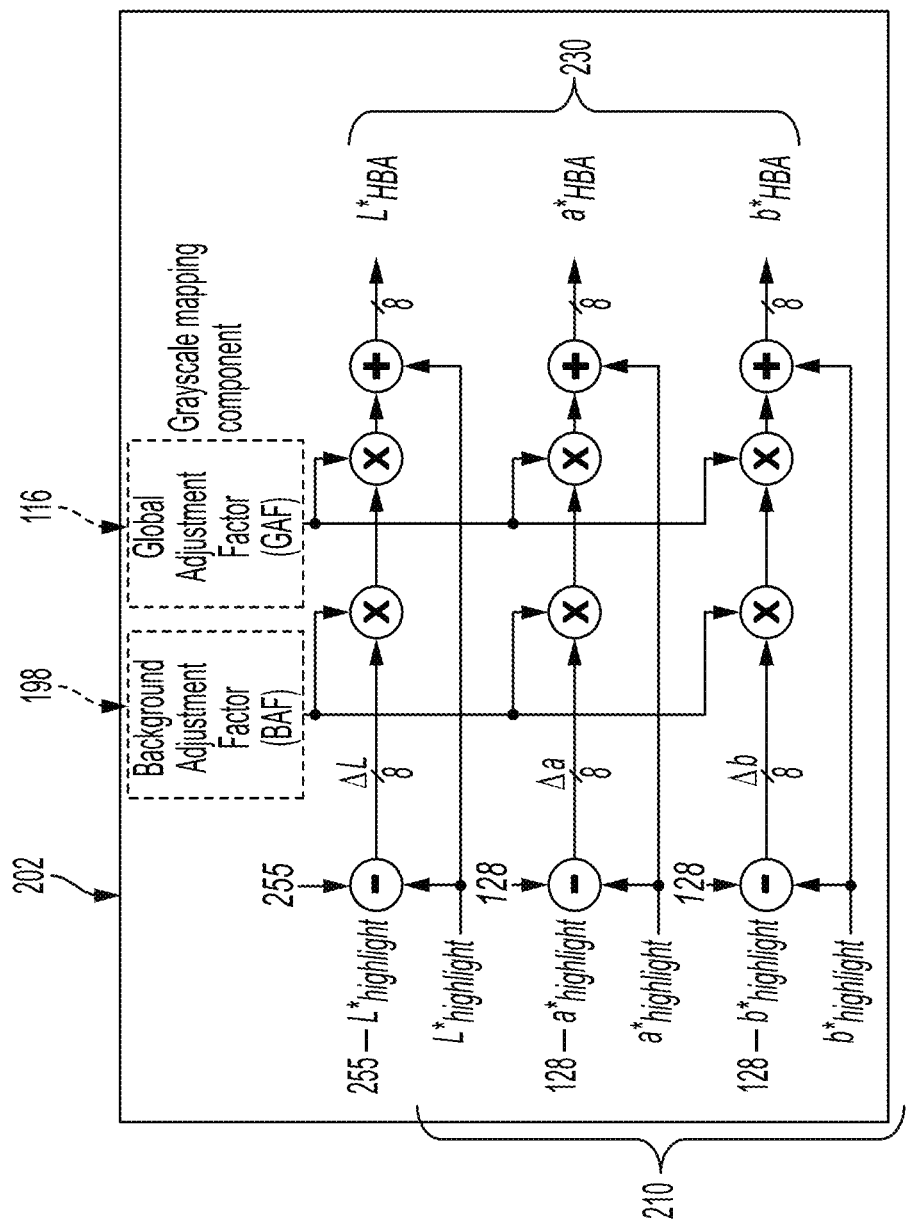
FIG. 16 illustrates an exemplary grayscale mapping component for the background adjust kernel of FIG. 11.

With reference to FIG. 16, one embodiment of the grayscale mapping component 182 of FIG. 11 is illustrated. The grayscale mapping component 182 receives as input the $L_{highlight}^*$, $a_{highlight}^*$ and $b_{highlight}^*$ values 112 and a GAF value 116, as described for the direct mapping component 184 and additionally receives, for each pixel, a background adjustment factor 198, which is derived from the pixel's input L*a*b* values 72, as discussed with reference to FIGS. 3 and 11. The aim of the grayscale mapping component 182 is to process potential background pixels in a variable manner in order to avoid/minimize the abrupt switching artifacts that are typically generated in many threshold-based segmentation classification algorithms. In other words, the extent in which any background pixels are driven toward a selected color 112, other than pure white, is based upon the neutral strength of the pixel in question (as represented by its BAF) as opposed to being fully labeled/classified as "background" versus "non-background".

The grayscale mapping component 182 employs grayscale highlight mapping equations for each color channel:

$$Lab_{HBA}=Lab_{Highlight}+(GAF\times BAF\times(Lab_{WhitePoint}-Lab_{Highlight})) \quad (6)$$

where BAF is the background adjustment factor 198 and varies between 0 and 1 and GAF is the selected Global adjustment Factor 116.

The equations (6) are thus identical to those for the direct highlight mapping component except that each pixel is associated with a respective BAF 198 which is used in the computation. For example, consider that the same user-selected pink color (83,24,4) and GAF (0.5) are selected as above, and the pixel has a high probability of being background (e.g., a BAF of 0.9), then:

$$L_{HBA}^*=83+(0.5\times0.9\times(255-83))=160$$

$$a_{HBA}^*=24+(0.5\times0.9\times(128-24))=71$$

$$b_{HBA}^*=4+(0.5\times0.9\times(128-4))=60$$

The output $Lab_{HBA}$ 230 is thus (160,71,60) (with values being rounded to the nearest integer). In contrast, if the pixel has a low probability of being a background pixel (e.g., a BAF of 0.1), then the output $Lab_{HBA}$ 230 is (92,29,10). Thus, in the latter case, the pixel is only driven slightly towards the selected color, in this stage, i.e., retains most or all of its original color, since it is not considered as background, or only weakly so. Pixels which do not exceed a preselected threshold BAF (e.g., 0), receive no adjustment at this stage.

As will be appreciated, a single set of equations can be used for the direct and grayscale methods:

$$L_{HBA}^*=L_{Highlight}^*+(GAF\times B\times(L_{Whitepoint}^*-L_{Highlight}^*)),$$

$$a_{HBA}^*=a_{Highlight}^*+(GAF\times B\times(a_{Whitepoint}^*-a_{Highlight}^*)), \text{ and}$$

$$b_{HBA}^*=b_{Highlight}^*+(GAF\times B\times(b_{Whitepoint}^*-b_{Highlight}^*)),$$

or a function thereof, where:

B represents the background adjustment factor computed for the respective pixel and is from 0 to 1 (for grayscale highlight mapping), or B is the background class, selected from 0 and 1 (for direct highlight mapping), $L_{Highlight}^*$, $a_{Highlight}^*$, and $b_{Highlight}^*$ are the luminance and chrominance values of the selected highlight color, $L_{Whitepoint}^*$, $L_{Whitepoint}^*$ and $L_{Whitepoint}^*$ are luminance and chrominance values for white (255, 128, and 128 in 8 bit format), and GAF is the global adjustment factor which is independent of the luminance and chrominance values of the pixel.

Note, unlike white point mapping, these equations do not use the input L*, a*, and b* values.

Returning to FIG. 11, the highlight region identifier 188 determines which pixels are to be modified, based on the selected region 158 or text 162 and outputs a respective pixel class 250 for each pixel, based on the selections. The classes may include white point mapping, grayscale highlight mapping, and direct highlight mapping. The mixture component 190 receives the pixel class 250 and calls on the appropriate component 180, 182, or 184 for the adjusted (L*a*b*) values 196 or 230 for the respective pixel, based on the class. In one embodiment, if the BAF 198 is greater than the threshold 194, e.g., 0, and the pixel resides in the highlight region 158 or selected text 162, the mixture component outputs the highlight background adjusted $L^*_{HBA}$, $a^*_{HBA}$, $b^*_{HBA}$ values, otherwise, the white background adjusted $L^*_{WBA}$, $a^*_{WBA}$, $b^*_{WBA}$ values are output.

The optional background sweep function 192 applies a sweep threshold 254 to the adjusted L* value: $L^*_{HBA}$, or $L^*_{WBA}$. If $L^*_{WBA}$ exceeds the threshold 254, the pixel's L*, a* and b* values are set to pure white (255, 128, 128) to generate the output values 76, otherwise the output values are $L^*_{WBA}$, $a^*_{WBA}$, $b^*_{WBA}$. If highlight background adjusted $L^*_{HBA}$, $a^*_{HBA}$, $b^*_{HBA}$ values are above respective sweep thresholds 254 the pixel color is set to the highlight color 112.

The sweep threshold 254 may be programmable, e.g., by a user. For example, the user may be permitted to select between two or more values for the sweep threshold. The sweep threshold 254 (or at least one of a set of programmable sweep thresholds) for the $L^*_{WBA}$ is generally close to 255, but not so low that all pixels with a BAF 198 of less than 1.0 are automatically assigned to pure white. In the case of the thresholds 254 for $L^*_{HBA}$, $a^*_{HBA}$, $b^*_{HBA}$, the sweep thresholds may be a function of the highlight color 112, e.g., 90% or 95% of the L*, a*, and b*values 112. Having a sweep function is useful in that it ensures that the L*, a*, and b* values are constrained to the same white point or selected color above a certain value or values.

The adjusted values for each pixel, as optionally modified by the sweep function 192, are output from the background adjustment component 84, as illustrated at 76 in FIG. 3, and input to the post-processing component(s) 58, if any.

In the exemplary embodiment, all pixels of the image are processed by the background adjustment component 56. However, it is also contemplated that such processing could be limited to pixels in a region or regions of the image that together occupy less than the entire image, such as a border region of the image or a text region of the image. In one embodiment, identifying candidate background regions for processing by the background adjustment component 56 is performed by the page background detection component 54, upstream of the background adjustment component.

Figure 17:
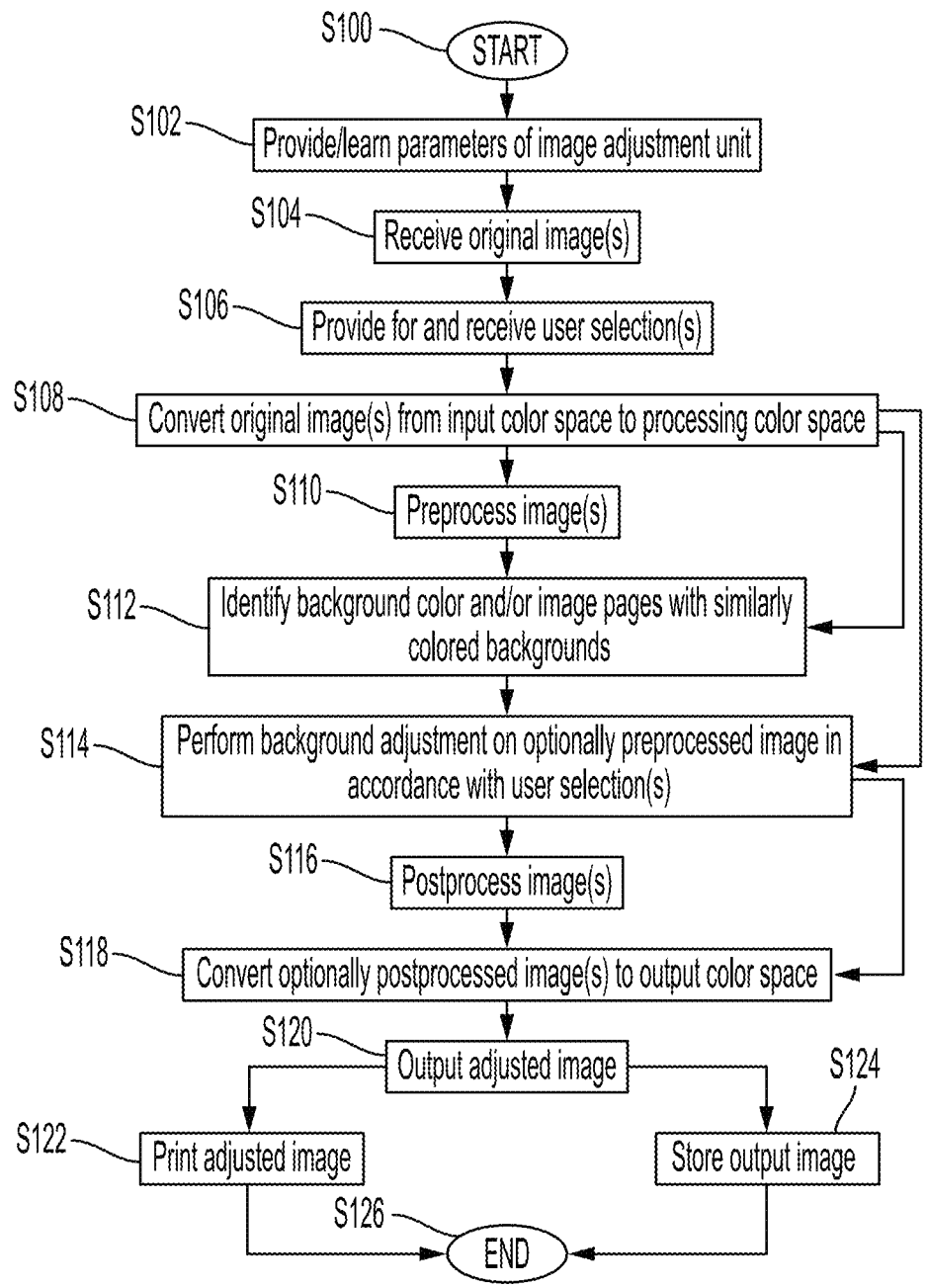
FIG. 17 is a flow diagram of a method for image adjustment in accordance with another aspect of the exemplary embodiment.

FIG. 17 illustrates an image processing method which may be performed with the device of FIG. 1. The method begins at S100.

At S102, parameters of the adjustment unit are provided. This may include, with the parameter learning component 64, learning and/or setting parameters of LUTs (or other suitable data structures which are referred to generally as LUTs) and other parameters, as described further below.

At S104, one or more original image(s) 16, such as a scanned image of a hardcopy document, is received by the input device 36, and may be stored in memory 30.

At S106, provision is made for a user to input background adjustment selections 42, via the background adjustment selector (GUI) 44. These may include one or more of a selected highlight color 112, a selected mapping mode 114, a selected region 158 and/or 162 text to be highlighted, a global adjustment factor (GAF) 116, a BAF threshold 194, a background sweep threshold 254, a selected LUT 200, 202, pages to be processed differently, and the like. As will be appreciated, some of these selections may be preset, e.g., for a detected background that is pink, a pink highlight color 112 is automatically selected.

At S108, each original image 16 is converted to a suitable color space for processing, by the first conversion component 50.

At S110, each converted image 70 may be preprocessed in one or more preprocessing operations, by the component 52 to generate a preprocessed digital image 72.

At S112, a background color 75 of a page is identified by the component 54, e.g., from the border of a copy page or other region which is predicted to have a high likelihood of being background. At this stage, page images with similar background colors may be identified, by the component 54. The background color 75 may be an average or other function of the colors of pixels in the predicted background region. This step may be performed on the original images 16, converted images 70, or preprocessed images 72. The background color may be displayed to the user, e., via the user interface 44, and/or used to define the selected background color 150 in automated systems/modes.

At S114, background adjustment is performed on the optionally preprocessed page image(s), by the component 56, based on the user selections and optionally also on the background color detected at S112. Further details on the background adjustment step are described below, with reference to FIG. 18.

At S116, the background-adjusted image may be post-processed in one or more post-processing operations, by the component 58.

At S118, the background-adjusted, optionally post-processed image is converted to an output image in an output device color space, such as CMYK (for a printer), RGB (for a color monitor) by the component 60.

At S120, the output image is output by the component 62.

At S122, the output image may be rendered in hardcopy form, by printing. Alternatively, or additionally, at S124, the output image may be stored in memory, e.g., for later viewing on a screen, or for subsequent processing.

The method ends at S126.

Figure 18:
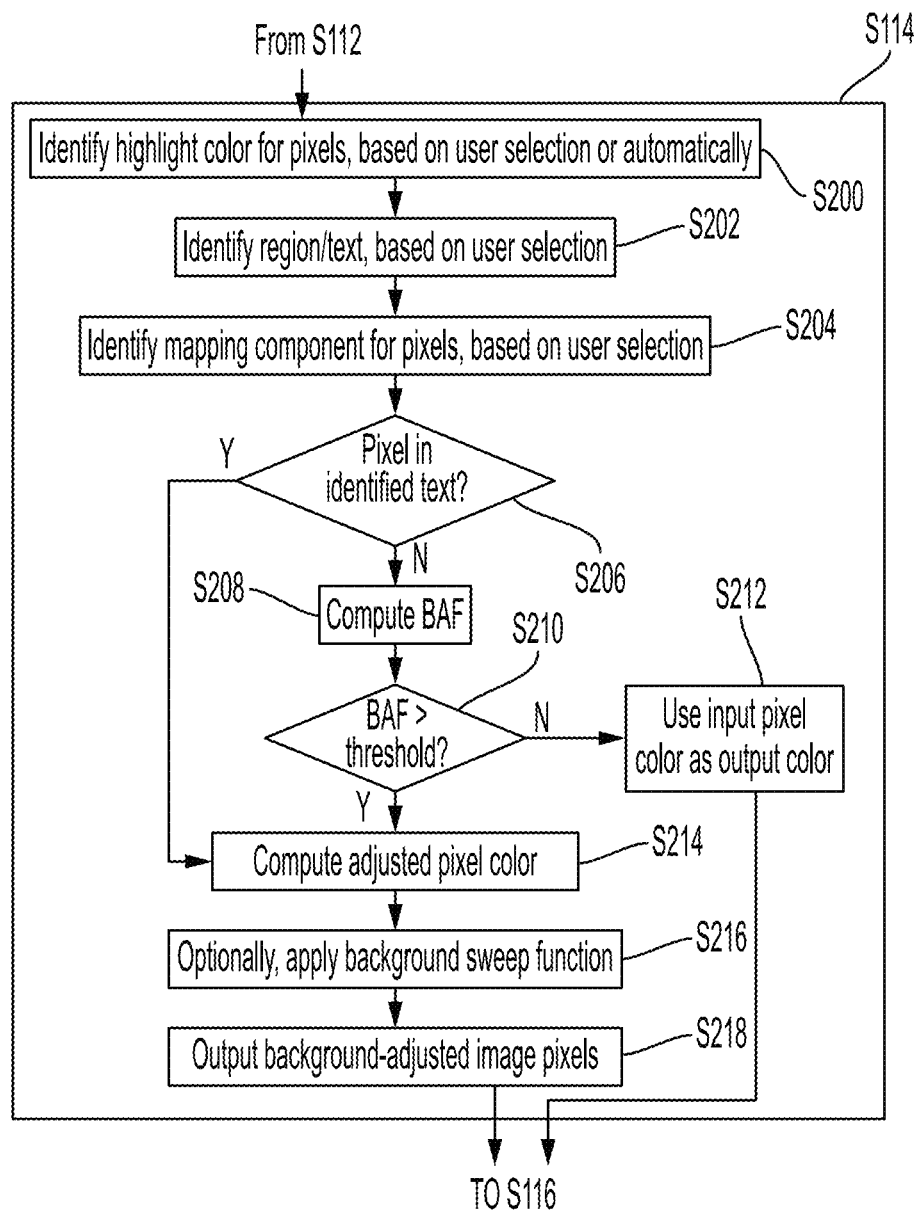
FIG. 18 is a flowchart illustrating background adjustment in the method of FIG. 17.

With reference to FIG. 18, a flowchart summarizing the background adjustment process of S114 of FIG. 17 is shown.

At S200, the received user selections 42 are used by component 188 to identify a user-selected (or automatically selected) highlight color 112, if any (pure white or detected background color by default).

At S202, if the user has selected a region or text to be highlighted, the corresponding region/text is identified.

At S204, if the user has selected a mapping method, an appropriate mapping component 180, 182, or 184 is selected for each pixel.

At S206, for each pixel, if the pixel is identified as being in text to be highlighted, the method proceeds to S214, otherwise the method to S208.

At S208, a BAF 198 is computed for each remaining pixel (or only for pixels in the highlight region, if selected), as described with respect to FIG. 11. In particular, a background strength is computed for each pixel, based on its (average) background level. A luminance strength is also computed for each pixel, based on its luminance value. The two values are aggregated (e.g., multiplied) to compute the BAF.

If at S210, the BAF is above the BAF threshold 194, then the method proceeds to S214, otherwise to at S212.

At S212, the pixel retains its input color as the output color.

At S214, the selected mapping method is applied to other pixels. The mixture component may call on the appropriate mapping component for each pixel. Each pixel is processed according to its mapping class, by the identified mapping component, to generated adjusted values 196 or 230, as described above for FIGS. 11, and 14-16.

In the case where a user has selected text highlighting, this may result in background pixels surrounding the text undergoing white point mapping by default, while the pixels to be highlighted undergo direct highlight mapping.

In the case where a user has selected grayscale highlight mapping for the entire image, this may result in all pixels classed as background pixels in the image having their pixel color adjusted according to equations (6), based on the selected highlight color and GAF.

In the case where a user has selected grayscale highlight mapping in a particular region (less than the entire image), this may result in all pixels classed as background pixels in the selected region having their pixel color adjusted according to equations (6), with pixels outside the region undergoing no adjustment or undergoing white point adjustment.

In the case where a user has selected direct highlight mapping for the entire image, this may result in all pixels classed as background pixels in the image having their pixel color adjusted according to equations (5).

In the case where a user has selected direct highlight mapping for only a region of the image (less than the entire image), this may result in all pixels classed as background pixels in the region of the image having their pixel color adjusted according to equations (5). Pixels outside the region may undergo no adjustment or undergoing white point adjustment.

In the case where a user has selected white point mapping, this may result in all pixels classed as background pixels in the image having their pixel color adjusted according to equations (2-4).

At S216, for each pixel undergoing an adjustment mapping, a background sweep threshold (or thresholds) 254 may be applied to the adjusted values 196 or 230. When the threshold(s) 254 is met, pixels are replaced with pure white (in the case of white point mapping) or the selected color (in the case of direct or grayscale highlight mapping).

At S218, the background-adjusted image pixels are output for optional post-processing and conversion to the rendering color space.

The method illustrated in FIGS. 17 and 18 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the image adjustment unit 12 (for example, an internal hard drive of RAM), or may be separate (for example, an external hard drive operatively connected with the unit 12), or may be separate and accessed via a digital data network such as a local area network (LAN) or the Internet (for example, as a redundant array of inexpensive or independent disks (RAID) or other network server storage that is indirectly accessed by the unit 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 17 and/or 18 can be used to implement the method for image adjustment. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further aspects of the system and method will now be described.

As discussed above, various LUTs and adjustment parameters are used in the exemplary system, which can be programmed and adjusted to optimize results for a particular printer, paper type, and/or colorants used.

Without intending to limit the scope of the exemplary embodiment, the following Example demonstrates application of the system and method.

EXAMPLE

An image adjustment unit 10 is instantiated as either a CPU or GPU resource within the software image-path(s), thereby providing a mechanism in which to optimize or "balance" the overall image processing throughput rate.

The software image path which is used to evaluate the method includes a background adjustment component 56, a first conversion component 50, a second conversion component 60, and various preprocessing and post-processing components 52, 58. These include a symmetric filter, and components for cropping, scaling, padding, neutral (gray) edge enhancement, error diffusion, and compression. The first conversion (RGB to L*a*b*) is performed by a 3×3 color space conversion component. The second conversion (L*a*b* to CMYK) is performed by trilinear interpolation. In the background adjustment component 56, the trilinear interpolation component 98 and (3×3, 5×5, or 7×7) box filter 92 are compiled with Intel precompiled GPU kernels. The background adjust kernel 84 is generated using OpenCL language employing vectorized simd intrinsics (compiled on an ApolloLake™ GPU). The first conversion, neutral edge enhancement, and second conversion are performed with a GPU kernel (Intel precompiled GPU). Each kernel is multi-threaded and processes the image on a tile-by-tile basis in order to accelerate the overall graph times. The three input remapping LUTs 102, 103, 104, the luminance strength LUT 202, and the background strength LUT 200 (as shown in FIGS. 4 and 11) are each 256-element, floating-point LUTs.

Due to the precision with which the background kernel can segment and detect what is defined and measured as "background", both highlight mapping methods provide unique rendering properties. The simple direct highlight mapping method provides consistent and uniform background CMYK marking values, whereas leveraging the pixel's gray multi-level (8 bpp) information can be used to match the natural paper-stock variations contained in the original scanned document when processing the image via the grayscale highlight mapping method.

Figure 19:
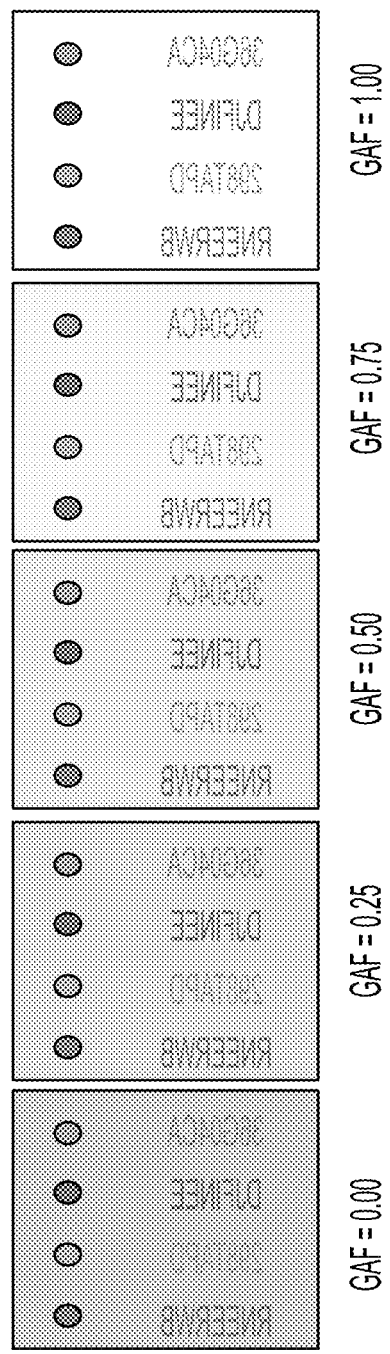
FIG. 19 illustrates direct highlight editing at different global adjustment factors.

FIG. 19 illustrates an L*a*b* image snippet generated via a software model to illustrate the direct highlight mapping method under various levels of global adjustment factors (GAFs). The original document is a scanned text document originally printed on yellow paper stock and processed via global background pink high-light mapping across the entire document with Global Adjust Factors (GAFs) ranging from 0.00 to 1.00 in 0.20 increments. Although shown in in black and white, for ease of illustration, the background is actually different levels of pink, depending on the GAF selected. In the image-snippet, the background is properly detected and modified without producing any collateral artifacts within the foreground (text) regions. This is mainly due to leveraging the full capabilities of the 3D trilinear interpolation kernel to segment precisely the regions of the color gamut in which to detect and modify the regions classified as background.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image processing device comprising:
   an input device which receives image adjustment selections from an associated user interface device;
   a processor;
   a memory storing processor-executable instructions which, when executed by the processor, implement:
   a user interface generator, which generates a background adjustment selector for presenting to a user on the user interface device;
   a background adjustment component which, for each of a plurality of pixels of an input image computes adjusted color values, as a function of at least one of:
   a background adjustment factor computed for the respective pixel, wherein the background adjustment factor is a function of a background strength of the pixel and a luminance strength of the pixel, and
   a background class derived from the computed background adjustment factor;
   an image output component which outputs an output image derived from the adjusted color values for the plurality of pixels.

2. The image processing device of claim 1, wherein the background strength of each of the plurality of pixel is derived from a luminance value of the pixel.

3. The image processing device of claim 2, wherein the background strength of each of the plurality of pixel is derived from an aggregated background level which is derived from the luminance value of the pixel and luminance values of a set of local pixels.

4. The image processing device of claim 3, wherein the background strength of each of the plurality of pixels is computed as a non-linear function of the aggregated background level.

5. The image processing device of claim 1, wherein the luminance strength of each of the plurality of pixels is computed as a non-linear function of a luminance value of the pixel.

6. The image processing device of claim 1, wherein said color values include a luminance value and chrominance values and for each of the plurality of pixels, the background adjustment component computes an adjusted luminance value and adjusted chrominance values as a function of the background adjustment factor computed for the respective pixel.

7. The image processing device of claim 1, wherein said color values include a luminance value and chrominance values and for each of the plurality of pixels, the background adjustment component computes an adjusted luminance value and adjusted chrominance values as a function of the background class computed for the respective pixel.

8. The image processing device of claim 1, wherein for each of the plurality of pixels, the background adjustment component computes the background adjust factor as a product of the background strength and luminance strength of the pixel.

9. The image processing device of claim 1, wherein the selections include a selected highlight color and wherein for each of at least some of the plurality of pixels, the background adjustment component computes an adjusted luminance value $L^*_{HBA}$ and adjusted chrominance values $a^*_{HBA}$ and $b^*_{HBA}$ according to:

$$L^*_{HBA} = L^*_{Highlight} + (GAF \times B \times (L^*_{Whitepoint} - L^*_{Highlight})),$$

$$a^*_{HBA} = a^*_{Highlight} + (GAF \times B \times (a^*_{Whitepoint} - a^*_{Highlight})), \text{ and}$$

$$b^*_{HBA} = b^*_{Highlight} + (GAF \times B \times (b^*_{Whitepoint} - b^*_{Highlight})),$$

or a function thereof,
where:
   B is the background adjustment factor computed for the respective pixel and is from 0 to 1, or B is the background class, selected from 0 and 1,
   $L^*_{Highlight}$, $a^*_{Highlight}$, and $b^*_{Highlight}$ are luminance and chrominance values of the selected highlight color,
   $L^*_{Whitepoint}$, $a^*_{Whitepoint}$ and $b^*_{Whitepoint}$ are luminance and chrominance values for white, and
   GAF is a global adjustment factor which is independent of luminance and chrominance values of the pixel.

10. The image processing device of claim 9, where the image adjustment selections include the global adjustment factor.

11. The image processing device of claim 1, where the image adjustment selections include a highlight region and the plurality of pixels form the highlight region.

12. The image processing device of claim 1, where the image adjustment selections include a text highlight color and a sequence of characters to be highlighted, and the memory further stores processor-executable instructions for identifying occurrences of the sequence of characters in the image as a function of the text highlight color.

13. The image processing device of claim 1, wherein for each of the plurality of pixels, the background adjustment component determines whether the adjusted luminance value exceeds a sweep threshold and wherein when the adjusted luminance value exceeds the sweep threshold, the pixel's adjusted luminance and adjusted chrominance values are set to the selected color values, otherwise the pixel's adjusted luminance and adjusted chrominance values are unchanged.

14. The image processing device of claim 1, wherein the memory further stores processor-executable instructions to implement:

a first conversion component which converts the plurality of pixels of the input image from an input color space to a luminance-chrominance color space; and a second conversion component which converts the adjusted luminance value and adjusted chrominance values for the plurality of pixels to an output color space.

15. The image processing device of claim 14, wherein the memory further stores processor-executable instructions to implement at least one of:

a preprocessing component which performs preprocessing of the plurality of pixels in the luminance-chrominance color space prior to background adjustment; and a post-processing component which performs post-processing of the plurality of pixels in the luminance-chrominance color space after the background adjustment.

16. The image processing device of claim 1, further comprising an image output device which renders the output image.

17. The image processing device of claim 16, wherein the image output device comprises at least one of:

a printer which renders the output image on print media, and a display device which displays the output image on a display screen.

18. An image processing method comprising:
receiving an input image comprising a plurality of pixels;
for each of the plurality of pixels:
computing a background strength of the pixel;
computing a luminance strength of the pixel;
computing a background adjustment factor that is a function of the background strength and the luminance strength of the pixel; and
computing an adjusted luminance value and adjusted chrominance values for the pixel as a function of a user-selected highlight color and the background adjustment factor of the pixel; and
outputting an output image derived from the adjusted luminance and adjusted chrominance values for the plurality of pixels.

19. The image processing method of claim 18, wherein:
the background strength of each of the plurality of pixels is computed as a non-linear function of an aggregate of luminance value of the pixel and luminance values of a set of local pixels; and wherein the luminance strength of each of the plurality of pixels is computed as a non-linear function of the luminance value of the pixel.

20. An image processing device comprising:
an image adjustment unit which receives an input image, a selected highlight color and a selected global adjustment factor, wherein the image adjustment unit includes a processor and a memory storing processor-executable instructions which, when executed by the processor, implement a background adjustment component which for each of a plurality of pixels of the input image:
computes a background strength of the pixel;
computes a luminance strength of the pixel;
computes a background adjustment factor that is a function of the background strength and the luminance strength of the pixel; and
computes adjusted luminance and adjusted chrominance values for the pixel as a function of the background adjustment factor, the selected highlight color and the selected global adjustment factor; and an image output device which receives an output image derived from the adjusted luminance and adjusted chrominance values for the plurality of pixels, and which renders the output image by printing.

* * * * *